(12) United States Patent
Chiu et al.

(10) Patent No.: US 12,334,842 B2
(45) Date of Patent: Jun. 17, 2025

(54) VOLTAGE CONVERSION DEVICE AND VOLTAGE CONVERSION METHOD THEREOF

(71) Applicant: INDUSTRIAL TECHNOLOGY RESEARCH INSTITUTE, Hsinchu (TW)

(72) Inventors: Chih-Chung Chiu, Miaoli (TW); Yan-Fu Jhou, Tainan (TW); Chih-Chang Lee, Tainan (TW); Chih-Cheng Wu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 135 days.

(21) Appl. No.: 18/089,110

(22) Filed: Dec. 27, 2022

(65) Prior Publication Data

US 2024/0178765 A1    May 30, 2024

(30) Foreign Application Priority Data

Nov. 21, 2022   (TW) .................................. 111144396

(51) Int. Cl.
*H02M 7/5395* (2006.01)
*H02M 1/00* (2006.01)

(52) U.S. Cl.
CPC ....... *H02M 7/5395* (2013.01); *H02M 1/0095* (2021.05)

(58) Field of Classification Search
CPC ... H02M 7/5395; H02M 1/0095; H02M 7/487
See application file for complete search history.

(56) References Cited

U.S. PATENT DOCUMENTS

| 7,920,393 | B2 * | 4/2011 | Bendre | ................. | H02M 7/487 363/39 |
| 9,356,536 | B2 * | 5/2016 | Bala | ....................... | H02M 1/32 |

(Continued)

FOREIGN PATENT DOCUMENTS

| CN | 107437901 A | 12/2017 |
| CN | 114244168 A | 3/2022 |

(Continued)

OTHER PUBLICATIONS

Lu et al. "A new three-phase inverter built by a low-frequency three-phase inverter in series with three high-frequency single-phase inverters", IEEE 7th International Power Electronics and Motion Control Conference—ECCE Asia, Jun. 2-5, 2012, Harbin, China, pp. 1573-1577.

(Continued)

*Primary Examiner* — Peter M Novak
(74) *Attorney, Agent, or Firm* — Birch, Stewart, Kolasch & Birch, LLP

(57) ABSTRACT

A voltage conversion device includes a filter circuit, a first inductor, a second inductor a first conversion module, a second conversion module, and a control circuit. The filter circuit is electrically connected to a first AC terminal and a second AC terminal. The first inductor is electrically connected to the first AC terminal and a first conversion terminal. The second inductor is electrically connected to the second AC terminal and a second conversion terminal. The first conversion module is electrically connected to a first DC voltage terminal, a second DC voltage terminal, and the first conversion terminal. The second conversion module is electrically connected to the first DC voltage terminal, the second DC voltage terminal, and the second conversion terminal. The control circuit transmits switch-control signals to the first conversion module and the second conversion (Continued)

module. A voltage conversion method is used with the voltage conversion device.

20 Claims, 12 Drawing Sheets

(56) References Cited

U.S. PATENT DOCUMENTS

| | | | |
|---|---|---|---|
| 9,419,541 B2 | 8/2016 | Yoo | |
| 9,467,229 B2 | 10/2016 | Kai et al. | |
| 10,153,685 B2 | 12/2018 | Yoscovich et al. | |
| 10,680,506 B2 | 6/2020 | Yoscovich et al. | |
| 11,005,388 B2 | 5/2021 | Llerena et al. | |
| 2014/0307489 A1* | 10/2014 | Kidera | H02M 7/493 363/40 |
| 2015/0214854 A1 | 7/2015 | Gu et al. | |
| 2015/0333617 A1 | 11/2015 | Chapman et al. | |
| 2019/0312500 A1 | 10/2019 | Yoscovich et al. | |
| 2023/0223886 A1* | 7/2023 | Abarzadeh | H02P 27/14 318/504 |

FOREIGN PATENT DOCUMENTS

| | | |
|---|---|---|
| JP | 6025128 B2 | 11/2016 |
| TW | I282658 A | 6/2007 |
| TW | I556566 B | 11/2016 |

OTHER PUBLICATIONS

Singh et al., "A New Transistor Clamped 5-Level H-Bridge Multilevel Inverter with voltage Boosting Capacity", IEEE, 2012, 5 pages.

Tran et al., "A Three-Phase Cascaded H-Bridge Quasi Switched Boost Inverter for Renewable Energy", IEEE, 2017, 5 pages.

* cited by examiner

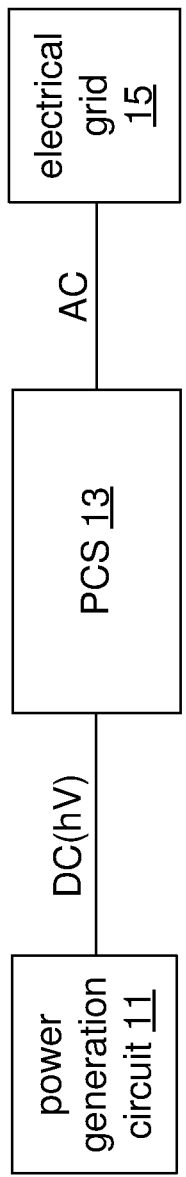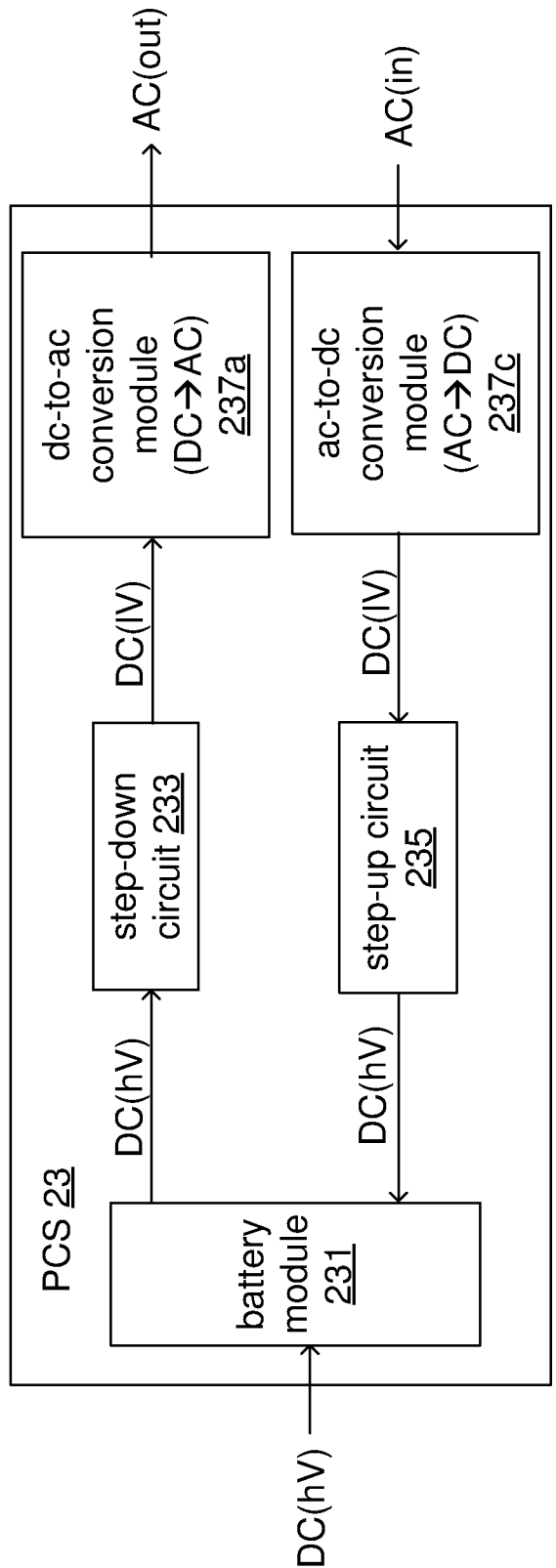
FIG. 1A (PRIOR ARTS)
FIG. 1B (PRIOR ARTS)

VOLTAGE CONVERSION DEVICE AND VOLTAGE CONVERSION METHOD THEREOF

This application claims the benefit of Taiwan application Serial No. 111144396, filed Nov. 21, 2022, the disclosure of which is incorporated by reference herein in its entirety.

TECHNICAL FIELD

The disclosure relates to a voltage conversion device and a voltage conversion method, and more particularly to a bidirectional voltage conversion device and a bidirectional voltage conversion method.

BACKGROUND

With the development of green technology, power conversion systems (PCS) have wider and wider applications. FIG. 1A is a schematic diagram showing that a power conversion system is installed between a power generation circuit and an electrical grid. The power conversion system 13 can convert the DC voltage (DC) obtained from the power generation circuit 11 (for example, wind turbine or solar panel) into AC voltage (AC) and then supply the AC voltage (AC) to the electrical grid 15. Also, the power conversion system 13 can be used for energy storage and backup power supply.

FIG. 1B is a block diagram illustrating the architecture of the power conversion system in the prior arts. The power conversion system 23 can perform bidirectional voltage conversion to selectively convert the DC voltage (DC) into the AC voltage (AC) or convert the AC voltage (AC) into the DC voltage (DC) as desired.

The power conversion system 23 converts the DC voltage (DC) into the AC voltage (AC) as follows. At first, the battery module 231 stores the high DC voltage DC(hV) received from the power generation circuit, and then transmits the high DC voltage DC(hV) to a step-down circuit (buck circuit) 233. The step-down circuit 233 steps down the high DC voltage DC(hV) to obtain the low DC voltage DC(lV). Subsequently, the step-down circuit 233 transmits the low DC voltage DC(lV) to the dc-to-ac conversion module 237a, which then converts the low DC voltage DC(lV) into output AC voltage AC(out) to be supplied to the electrical grid.

The power conversion system 23 converts the AC voltage (AC) into the DC voltage (DC) as follows. At first, the ac-to-dc conversion module 237c receives the input AC voltage AC(in) from the electrical grid, and then converts it into the low DC voltage DC(lV). Subsequently, a step-up circuit (boost circuit) 235 steps up the low DC voltage DC(lV) to obtain the high DC voltage DC(hV). Afterward, the step-up circuit 235 supplies the high DC voltage DC(hV) to the battery module 231 for energy storage.

From FIG. 1B, the power conversion system 23 in the prior parts needs both the dc-to-ac conversion module 237a and the ac-to-dc conversion module 237c to support bidirectional power conversion. Such implementation consumes more power, and the cost involving the circuits of the dc-to-ac conversion module 237a and the ac-to-dc conversion module 237c is much higher.

SUMMARY

The disclosure is directed to a voltage conversion device configured to convert the DC voltage into the AC voltage and convert the AC voltage into the DC voltage, and further directed to an associated voltage conversion method. According to the voltage conversion device of the disclosure, it is not required to provide two sets of circuits for two voltage conversion modes, respectively. Such a design can significantly reduce the cost of the circuits. Furthermore, the voltage conversion device of the disclosure adopts power transistors to switch on/off the circuits and thus considerably reduces the power consumption.

According to one embodiment, a voltage conversion device is provided. The voltage conversion device includes a filter circuit, a first inductor, a second inductor, a first conversion module, a second conversion module, and a control circuit. The filter circuit is electrically connected to a first AC terminal and a second AC terminal. The first inductor has a terminal electrically connected to the first AC terminal, and the second inductor has a terminal electrically connected to the second AC terminal. The first conversion module includes a first DC stage circuit, a first conversion stage circuit, and a first inner stage circuit. The first DC stage circuit is electrically connected to a first DC voltage terminal and a second DC voltage terminal. The first conversion stage circuit is electrically connected to another terminal of the first inductor. The first inner stage circuit is electrically connected between the first DC stage circuit and the first conversion stage circuit. The second conversion module includes a second DC stage circuit, a second conversion stage circuit, and a second inner stage circuit. The second DC stage circuit is electrically connected to the first DC voltage terminal and the second DC voltage terminal. The second conversion stage circuit is electrically connected to another terminal of the second inductor. The second inner stage circuit is electrically connected between the second DC stage circuit and the second conversion stage circuit. The control circuit is electrically connected to the first conversion module and the second conversion module. The control circuit transmits first switch-control signals to the first conversion module and transmits second switch-control signals to the second conversion module. A first current path in the first DC stage circuit, the first conversion stage circuit, and the first inner stage circuit is selected in response to the first switch-control signals, and a second current path in the second DC stage circuit, the second conversion stage circuit and the second inner stage circuit is selected in response to the second switch-control signals.

According to another embodiment, a voltage conversion method used with a voltage conversion device is provided. The voltage conversion device includes a filter circuit, a first conversion module, and a second conversion module. The first conversion module includes first switch units, and the second conversion module includes second switch units. The voltage conversion method includes the following steps. The first conversion module and the second conversion module receive a DC voltage from a battery module. The first conversion module and the second conversion module generate a modified sine wave between a first conversion terminal and a second conversion terminal. The filter circuit filters the modified sine wave to generate an AC voltage. The modified sine wave has a voltage equal to a positive DC voltage value when the first switch units and the second switch units enter a first conversion state. The modified sine wave has a voltage equal to half the positive DC voltage value when the first switch units and the second switch units enter a second conversion state or a third conversion state. The modified sine wave has a voltage equal to a ground voltage when the first switch units and the second switch units enter a fourth conversion state or a fifth conversion state. The modified sine wave has a voltage equal to half a negative DC voltage value when the first switch units and the second switch units enter a sixth conversion state or a seventh conversion state. The modified sine wave has a voltage equal to the negative DC voltage value when the first switch units and the second switch units enter an eighth conversion state. The first switch units and the second switch units being switched on and configured for receiving a first PWM signal in the first conversion state are switched off in the eighth conversion state. The first switch units and the second switch units being switched on and configured for receiving a second PWM signal in the second conversion state are switched off in the seventh conversion state. The first switch units and the second switch units being switched on and configured for receiving a third PWM signal in the third conversion state are switched off in the sixth conversion state. The first switch units and the second switch units being switched on and configured for receiving a fourth PWM signal in the fourth conversion state are switched off in the fifth conversion state. The first switch units and the second switch units being switched on and configured for receiving a fifth PWM signal in the fifth conversion state are switched off in the fourth conversion state. The first switch units and the second switch units being switched on and configured for receiving a sixth PWM signal in the sixth conversion state are switched off in the third conversion state. The first switch units and the second switch units being switched on and configured for receiving a seventh PWM signal in the seventh conversion state are switched off in the second conversion state. The first switch units and the second switch units being switched on and configured for receiving an eighth PWM signal in the eighth conversion state are switched off in the first conversion state.

According to an alternative embodiment, a voltage conversion method used with a voltage conversion device is provided. The voltage conversion device includes a first inductor, a second inductor, a first conversion module, and a second conversion module. The voltage conversion method includes the following steps. An AC voltage is received between a first AC terminal and a second AC terminal. The first inductor is electrically connected between the first conversion module and the first AC terminal, and the second inductor is electrically connected between the second conversion module and the second AC terminal. A first lower conversion circuit, a first lower inner circuit and a first lower middle circuit of the first conversion module, and a second upper middle circuit, a second upper inner circuit, and a second upper conversion circuit of the second conversion module receive a first PWM signal when the AC voltage is rising from a ground voltage to a positive DC voltage value. A first current from the first AC terminal flows to the second AC terminal through the first inductor, the first conversion module, a third DC voltage terminal, the second conversion module, and the second inductor sequentially to generate a DC voltage between a first DC voltage terminal and a second DC voltage terminal. A first upper conversion circuit, a first upper inner circuit and a first upper DC circuit of the first conversion module and a second lower DC circuit, a second lower inner circuit, and a second lower conversion circuit of the second conversion module receive a second PWM signal when the AC voltage is decreasing from the positive DC voltage value to the ground voltage. A second current from the first AC terminal flows to the second AC terminal through the first inductor, the first conversion module, the first DC voltage terminal, a battery module, the second DC voltage terminal, the second conversion module, and the second inductor sequentially to generate the DC voltage.

The second lower conversion circuit, the second lower inner circuit and a second lower middle circuit of the second conversion module and a first upper middle circuit, the first upper inner circuit, and the first upper conversion circuit of the first conversion module receive a third PWM signal when the AC voltage is decreasing from the ground voltage to a negative DC voltage value. A third current from the second AC terminal flows to the first AC terminal through the second inductor, the second conversion module, the first conversion module, and the first inductor sequentially to generate the DC voltage. The second upper conversion circuit, the second upper inner circuit and a second upper DC circuit of the second conversion module and a first lower DC circuit, the first lower inner circuit, and the first lower conversion circuit of the first conversion module receive a fourth PWM signal when the AC voltage is rising from the negative DC voltage value to the ground voltage. A fourth current from the second AC terminal flows to the first AC terminal through the second inductor, the second conversion module, the first DC voltage terminal, the battery module, the second DC voltage terminal, the first conversion module, and the first inductor sequentially to generate the DC voltage.

BRIEF DESCRIPTION OF THE DRAWINGS

FIG. 1A (PRIOR ARTS) is a schematic diagram showing that a power conversion system is installed between a power generation circuit and an electrical grid.

FIG. 1B (PRIOR ARTS) is a block diagram illustrating the architecture of the power conversion system in the prior arts.

DETAILED DESCRIPTION

The disclosure provides a voltage conversion device with a bidirectional conversion function. In other words, the hardware circuit can convert the DC voltage (DC) into the AC voltage (AC) and convert the AC voltage (AC) into the DC voltage (DC) by using a single circuit structure.

Figure 2:
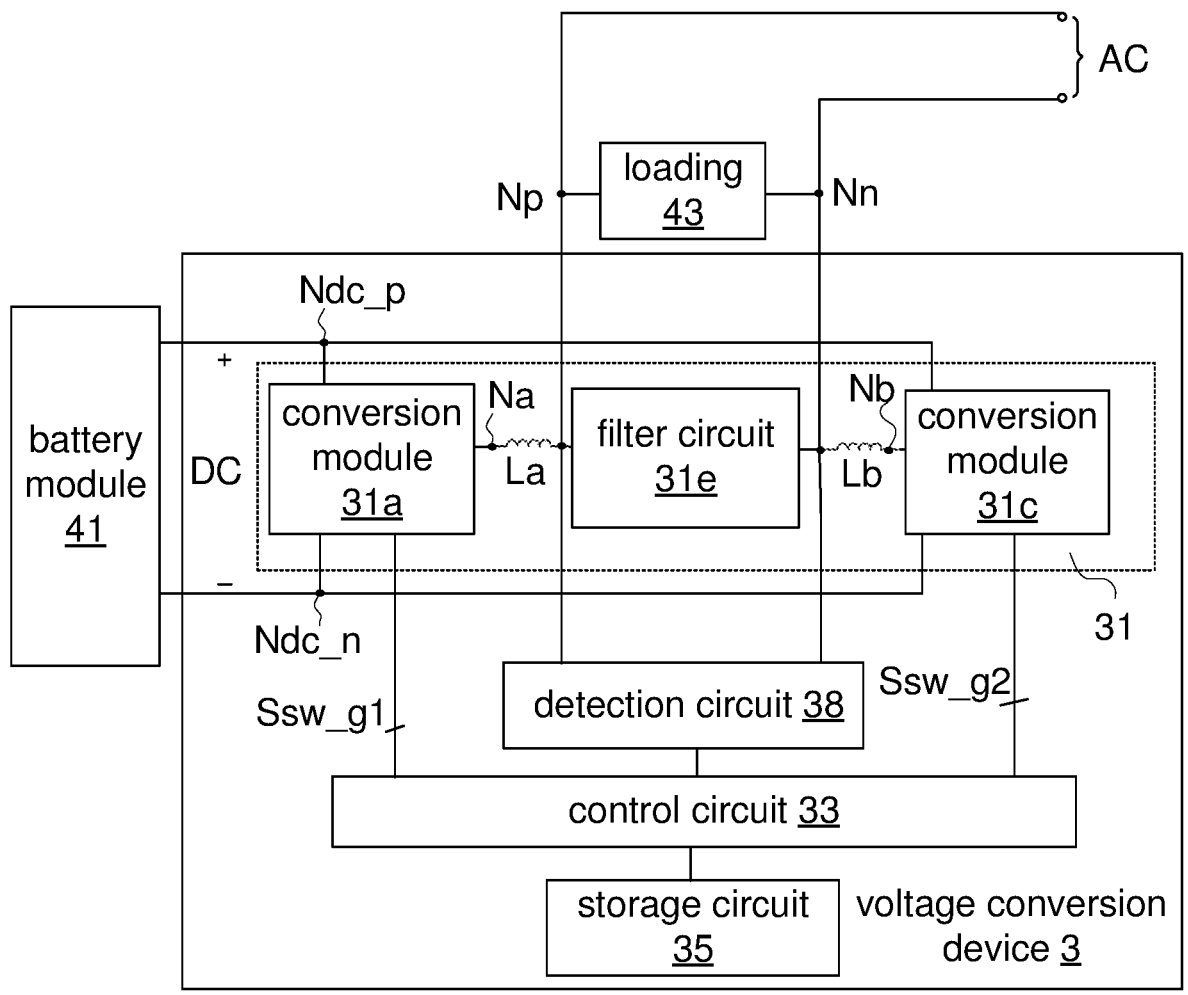
FIG. 2 is a block diagram of a voltage conversion device according to an embodiment of the disclosure.

FIG. 2 is a block diagram of a voltage conversion device according to an embodiment of the disclosure. The voltage conversion device 3 is electrically connected to a loading 43 and a battery module 41. The two terminals electrically connected to the voltage conversion device 3 and the loading 43 are defined as AC terminals Np, Nn in the description. Also, the two terminals electrically connected to the voltage conversion device 3 and the battery module 41 are defined as DC voltage terminals Ndc_p, Ndc_n. A DC voltage (DC) is formed between the two DC voltage terminals Ndc_p and Ndc_n; and an AC voltage (AC) is formed between the two AC terminals Np and Nn. The DC voltage (DC) has a fixed and stable DC voltage value Vdc. In a concise manner, the symbol Ndc_p may represent the AC voltage terminal Ndc_p or the voltage at the terminal Ndc_p; and the symbol Ndc_n may represent the AC voltage terminal Ndc_n or the voltage at the terminal Ndc_n according to the context.

The voltage conversion device 3 converts the DC voltage (DC) supplied by the battery module 41 into the AC voltage (AC), and then outputs the AC voltage (AC) to the loading 43. Alternatively, the voltage conversion device 3 receives the AC voltage (AC) from the AC terminals Np, Nn, converts the AC voltage (AC) into the DC voltage (DC), and charges the battery module 41 with the DC voltage (DC). During either process of converting the DC voltage (DC) into the AC voltage (AC) or converting the AC voltage (AC) into the DC voltage (DC), the voltage conversion device 3 is switched among several conversion states dynamically.

The voltage conversion device 3 includes a voltage-conversion module 31, a detection circuit 38, a control circuit 33, and a storage circuit 35. The voltage-conversion module 31 is electrically connected to the loading 43 and the battery module 41. The detection circuit 38 and the control circuit 33 are electrically connected to the voltage-conversion module 31. The control circuit 33 is further electrically connected to the detection circuit 38 and the storage circuit 35.

The voltage-conversion module 31 includes inductors La, Lb, a filter circuit 31e, and conversion modules 31a, 31c. The detection circuit 38, the loading 43, the inductor La, and the filter circuit 31e are jointly electrically connected to the AC terminal Np. The detection circuit 38, the loading 43, the inductor Lb, and the filter circuit 31e are jointly electrically connected to the AC terminal Nn. The inductor La and the conversion module 31a are jointly electrically connected to the conversion terminal Na. The inductor Lb and the conversion module 31c are jointly electrically connected to the conversion terminal Nb.

The control circuit 33 is implemented by a central processing unit (CPU) or a digital signal processor (DSP), which can perform the algorithm. The control circuit 33 decides and generates proper switch-control signals Ssw_g1, Ssw_g2 according to the current conversion state, and then transmits the switch-control signals Ssw_g1, Ssw_g2 to the conversion modules 31a, 31c. The switch-control signals Ssw_g1, Ssw_g2 are pulse width modulation (PWM) signals, for example, carrier phase-shifted-sinusoidal PWM (CPS-SPWM) signals or phase disposition SPWM (PD-SPWM) signals. The control circuit 33 generates the switch-control signals Ssw_g1, Ssw_g2 based on the CPS-SPWM and PD-SPWM technology can increase the operation efficiency of the voltage-conversion module 31.

The storage circuit 35 stores a lookup table. The control circuit 33 accesses the lookup table according to the conversion state of the voltage-conversion module 31 to generate the switch-control signals Ssw_g1, Ssw_g2 with specific waveforms to control interior circuits of the conversion modules 31a, 31e. The lookup table may have information (but not exclusively) of enabled elements and PWM waveforms associated with respective conversion states. When the voltage conversion device 3 is converting the DC voltage (DC) into the AC voltage (AC), the control circuit 33 generates the switch-control signals Ssw_g1, Ssw_g2 for performing the dc-to-ac conversion according to the lookup table to control the conversion states of the conversion modules 31a, 31c. Alternatively, when the voltage conversion device 3 is converting the AC voltage (AC) into the DC voltage (DC), the control circuit 33 generates the switch-control signals Ssw_g1, Ssw_g2 for performing the ac-to-dc conversion according to the lookup table to control the conversion states of the conversion modules 31a, 31c.

The control circuit 33 reads the lookup table stored in the storage circuit 35 according to the voltage conversion type, and then dynamically decides the switch-control signals Ssw_g1, Ssw_g2 according to the information in the lookup table so as to select and establish a proper current path in the conversion modules 31a, 31c. The dynamic control details of the process of converting the DC voltage (DC) into the AC voltage (AC) with the control circuit 33 will be given in FIGS. 5 and 6A-6H and the associated description. The dynamic control details of the process of converting the DC voltage (DC) into the AC voltage (AC) with the control circuit 33 will be given in FIGS. 7 and 8A-8D.

Figure 3:
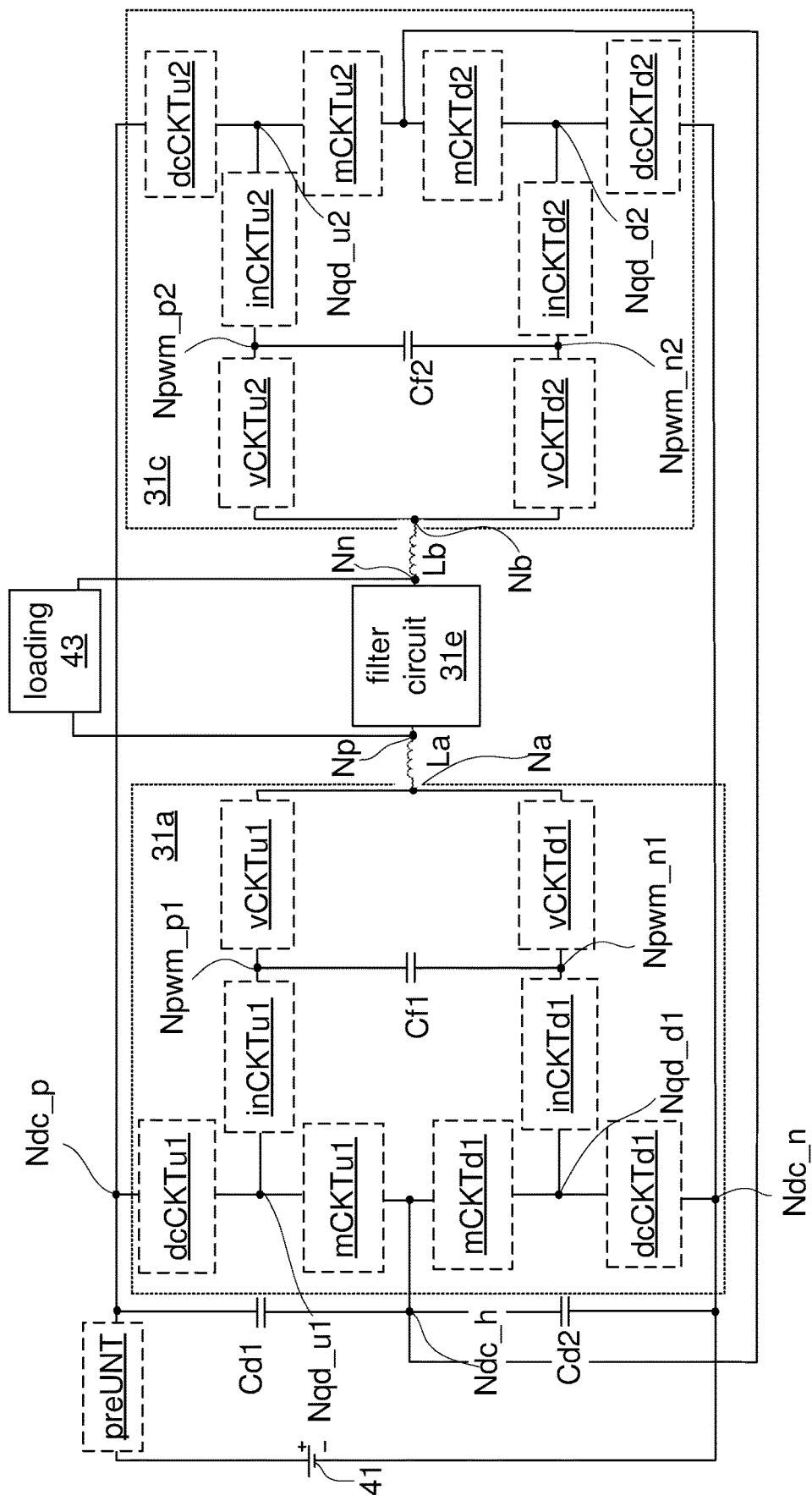
FIG. 3 is a block diagram of a voltage-conversion module according to an embodiment of the disclosure.

FIG. 3 is a block diagram of a voltage-conversion module according to an embodiment of the disclosure. In addition to the inductors La, Lb, the filter circuit 31e, and the conversion modules 31a, 31c, the voltage-conversion module 31 further includes a precharge switch unit preUNT and voltage divider capacitors Cd1, Cd2. The voltage divider capacitor Cd1 is electrically connected between the DC voltage terminal Ndc_p and a half-DC voltage terminal Ndc_h; and the voltage divider capacitor Cd2 is electrically connected between the half-DC voltage terminal Ndc_h and the DC voltage terminal Ndc_n. In a concise manner, the symbol Ndc_h may represent the half-DC voltage terminal Ndc_h or the voltage at the terminal Ndc_h according to the context.

When the voltage conversion device 3 is activated, the voltage divider capacitors Cd1, Cd2 are charged through the precharge switch unit preUNT. The voltage divider capacitors Cd1, Cd2 have equal capacitance so that the cross-voltage of the voltage divider capacitor Cd1 is equal to the cross-voltage of the voltage divider capacitor Cd2 ($V_{Cd1}=V_{Cd2}$). Therefore, the voltage difference (Ndc_p–Ndc_n) between the DC voltage terminal Ndc_p and the DC voltage terminal Ndc_n is equivalent to two times of the voltage difference (Ndc_h–Ndc_n) between the half-DC voltage terminal Ndc_h and the DC voltage terminal Ndc_n (that is, Ndc_p–Ndc_n=2(Ndc_h–Ndc_n)).

The conversion module 31a includes a flying capacitor Cf1, an upper DC circuit dcCKTu1, an upper middle circuit mCKTu1, a lower DC circuit dcCKTd1, a lower middle circuit mCKTd1, an upper inner circuit inCKTu1, a lower inner circuit inCKTd1, an upper conversion circuit vCKTu1, and a lower conversion circuit vCKTd1. To define the circuits based on their relative positions, the conversion module 31a is a combination of a DC stage circuit located near the DC voltage terminals Ndc_p, Ndc_n, a conversion stage circuit located near the conversion terminals Na, Nb, and an inner stage circuit located between the DC stage circuit and the conversion stage circuit.

The conversion module 31c includes a flying capacitor Cf2, an upper DC circuit dcCKTu2, an upper middle circuit mCKTu2, a lower DC circuit dcCKTd2, a lower middle circuit mCKTd2, an upper inner circuit inCKTu2, a lower inner circuit inCKTd2, an upper conversion circuit vCKTu2, and a lower conversion circuit vCKTd2. To define the circuits based on their relative positions, the conversion module 31c is a combination of a DC stage circuit located near the DC voltage terminals Ndc_p, Ndc_n, a conversion stage circuit located near the conversion terminals Na, Nb, and an inner stage circuit located between the DC stage circuit and the conversion stage circuit.

Table 1 shows the circuits in the DC stage circuits, the conversion stage circuits, and the inner stage circuits of the conversion modules 31a, 31c.

TABLE 1

|  | Conversion module 31a | Conversion module 31c |
| --- | --- | --- |
| DC stage circuit | Upper DC circuit dcCKTu1 | Upper DC circuit dcCKTu2 |
|  | Upper middle circuit mCKTu1 | Upper middle circuit mCKTu2 |
|  | Lower DC circuit dcCKTd1 | Lower DC circuit dcCKTd2 |
|  | Lower middle circuit mCKTd1 | Lower middle circuit mCKTd2 |
| Conversion stage circuit | Upper conversion circuit vCKTu1 | Upper conversion circuit vCKTu2 |
|  | Lower conversion circuit vCKTd1 | Lower conversion circuit vCKTd2 |
| Inner stage circuit | Upper inner circuit inCKTu1 | Upper inner circuit inCKTu2 |
|  | Lower inner circuit inCKTd1 | Lower inner circuit inCKTd2 |

From FIG. 3 and Table 1, the interior circuits and their connections in the conversion module 31a are virtually corresponding to those in the conversion module 31c (that is, mirror images of each other). The interior circuits and their connections in the conversion module 31a are described sequentially as follows. In the upper half of the conversion module 31a, as shown in FIG. 3, the upper DC circuit dcCKTu1 is electrically connected to the DC voltage terminal Ndc_p and a quarter-DC voltage terminal Nqd_u1; the upper middle circuit mCKTu1 is electrically connected to the quarter-DC voltage terminal Nqd_u1 and the half-DC voltage terminal Ndc_h; the upper inner circuit inCKTu1 is electrically connected to the quarter-DC voltage terminal Nqd_u1 and a modulation terminal Npwm_p1; and the upper conversion circuit vCKTu1 is electrically connected to the modulation terminal Npwm_p1 and the conversion terminal Na. Similarly, in the lower half of the conversion module 31a as shown in FIG. 3, the lower DC circuit dcCKTd1 is electrically connected to the DC voltage terminal Ndc_n and a quarter-DC voltage terminal Nqd_d1; the lower middle circuit mCKTd1 is electrically connected to the quarter-DC voltage terminal Nqd_d1 and the half-DC voltage terminal Ndc_h; the lower inner circuit inCKTd1 is electrically connected to the quarter-DC voltage terminal Nqd_d1 and a modulation terminal Npwm_n1; and the lower conversion circuit vCKTd1 is electrically connected to the modulation terminal Npwm_d1 and the conversion terminal Na. The flying capacitor Cf1 is located between the two halves of the conversion module 31a, wherein a positive terminal and a negative terminal of the flying capacitor Cf1 are electrically connected to the modulation terminals Npwm_p1 and Npwm_n1, respectively. When the flying capacitor Cf1 is fully charged, the cross-voltage VCf1 of the flying capacitor Cf1 is equal to one-quarter of the voltage difference between the DC voltage terminals Ndc_p, Ndc_n, that is, $$V\_Cf1 = 1/4(Ndc\_p - Ndc\_n).$$

Subsequently, the interior circuits and their connections in the conversion module 31c are described sequentially as follows. In the upper half of the conversion module 31c as shown in FIG. 3, the upper DC circuit dcCKTu2 is electrically connected to the DC voltage terminal Ndc_p and a quarter-DC voltage terminal Nqd_u2; the upper middle circuit mCKTu2 is electrically connected to the quarter-DC voltage terminal Nqd_u2 and the half-DC voltage terminal Ndc_h; the upper inner circuit inCKTu2 is electrically connected to the quarter-DC voltage terminal Nqd_u2 and a modulation terminal Npwm_p2; and the upper conversion circuit vCKTu2 is electrically connected to the modulation terminal Npwm_p2 and the conversion terminal Nb. Similarly, In the lower half of the conversion module 31c as shown in FIG. 3, the lower DC circuit dcCKTd2 is electrically connected to the DC voltage terminal Ndc_n and a quarter-DC voltage terminal Nqd_d2; the lower middle circuit mCKTd2 is electrically connected to the quarter-DC voltage terminal Nqd_d2 and the half-DC voltage terminal Ndc_h; the lower inner circuit inCKTd2 is electrically connected to the quarter-DC voltage terminal Nqd_d2 and a modulation terminal Npwm_n2; and the lower conversion circuit vCKTd2 is electrically connected to the modulation terminal Npwm_d2 and the conversion terminal Nb. The flying capacitor Cf2 is located between the two halves of the conversion module 31c, wherein a positive terminal and a negative terminal of the flying capacitor Cf2 are electrically connected to the modulation terminals Npwm_p2 and Npwm_n2, respectively. When the flying capacitor Cf2 is fully charged, the cross-voltage VCf2 of the flying capacitor Cf2 is equivalent to one-quarter of the voltage difference between the DC voltage terminals Ndc_p, Ndc_n, that is, $$V_{Cf2} = \frac{1}{4}(Ndc\_p - Ndc\_n).$$

Figure 4:
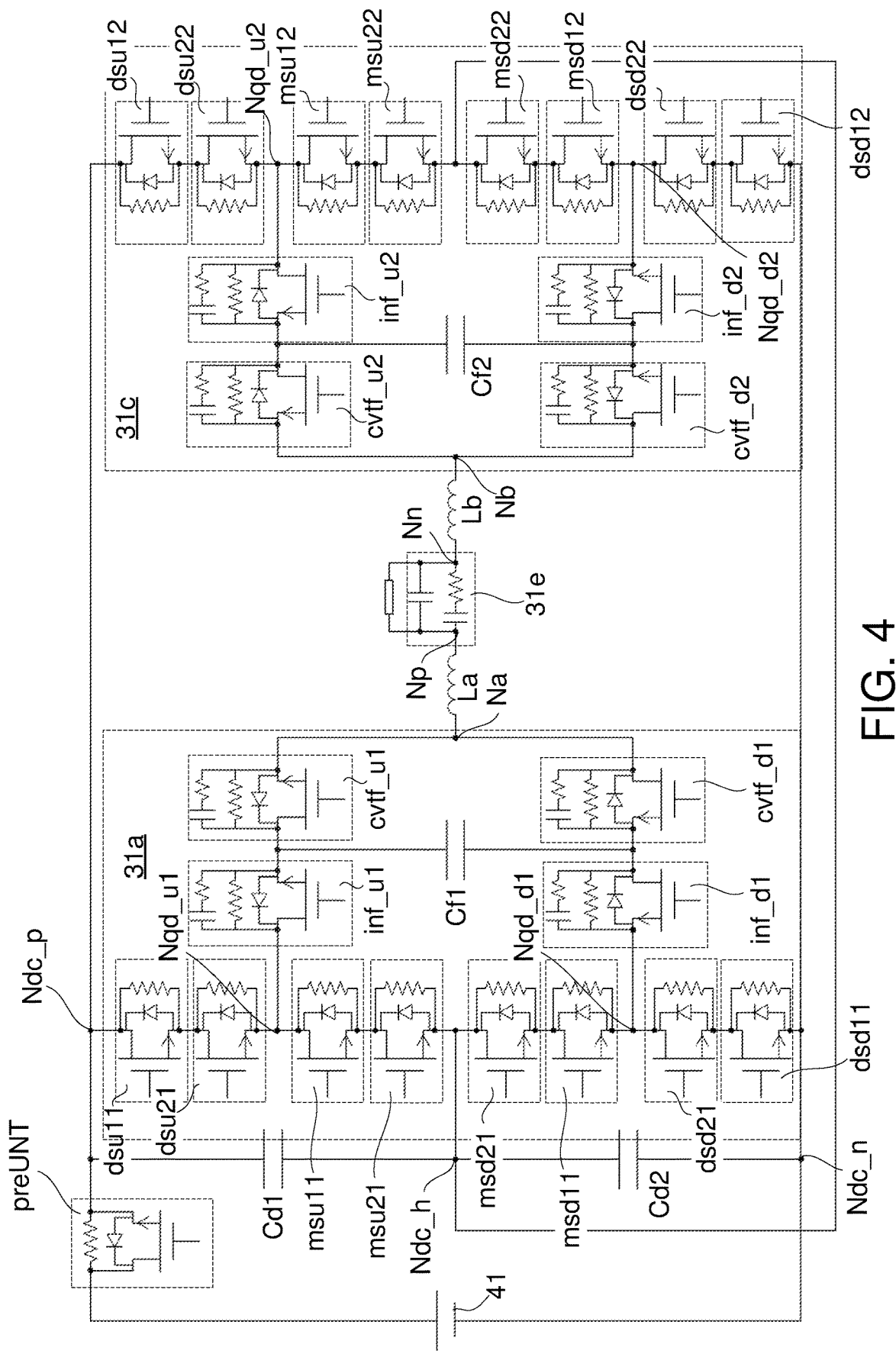
FIG. 4 is a circuit diagram of the voltage-conversion module according to the embodiment of the disclosure.

The subsequent description will provide further circuit details of the conversion modules 31a, 31c of FIG. 3. FIG. 4 is a circuit diagram of the voltage-conversion module according to the embodiment of the disclosure. Please refer to both FIGS. 3 and 4 for the description.

In the conversion module 31a, the upper DC circuit dcCKTu1 includes DC switch units dsu11, dsu21; the upper middle circuit mCKTu1 includes middle switch units msu11, msu21; the lower DC circuit dcCKTd1 includes DC switch units dsd11, dsd21; and the lower middle circuit mCKTd1 includes middle switch units msd11, msd21. The upper inner circuit inCKTu1 includes an inner switch unit inf_u1; and the lower inner circuit inCKTd1 includes an inner switch unit inf_d1. The upper conversion circuit vCKTu1 includes a conversion switch unit cvtf_u1; and the lower conversion circuit vCKTd1 includes a conversion switch unit cvtf_d1.

In the conversion module 31c, the upper DC circuit dcCKTu2 includes DC switch units dsu12, dsu22; the upper middle circuit mCKTu2 includes middle switch units msu12, msu22; the lower DC circuit dcCKTd2 includes DC switch units dsd12, dsd22; and the lower middle circuit mCKTd2 includes middle switch units msd12, msd22. The upper inner circuit inCKTu2 includes an inner switch unit inf_u2; and the lower inner circuit inCKTd2 includes an inner switch unit inf_d2. The upper conversion circuit vCKTu2 includes a conversion switch unit cvtf_u2; and the lower conversion circuit vCKTd2 includes a conversion switch unit cvtf_d2.

From FIG. 4, each conversion module 31a, 31c shows up-down symmetry in view of circuit blocks and switch units, which are shown in Table 2.

TABLE 2

| Position | Circuit | Conversion module 31a | Conversion module 31c |
|---|---|---|---|
| Upper half | Upper DC circuit | DC switch unit dsu11, dsu21 | DC switch unit dsu12, dsu22 |
| | Upper middle circuit | Middle switch unit msu11, msu21 | Middle switch unit msu12, msu22 |
| | Upper inner circuit | Inner switch unit inf_u1 | Inner switch unit inf_u2 |
| | Upper conversion circuit | Conversion switch unit cvtf_u1 | Conversion switch unit cvtf_u2 |
| Lower half | Lower DC circuit | DC switch unit dsd11, dsd21 | DC switch unit dsd12, dsd22 |
| | Lower middle circuit | Middle switch unit msd11, msd21 | Middle switch unit msd12, msd22 |
| | Lower inner circuit | Inner switch unit inf_d1 | Inner switch unit inf_d2 |
| | Lower conversion circuit | Conversion switch unit cvtf_d1 | Conversion switch unit cvtf_d2 |

In FIG. 4, each of the inner switch units (inf_u1, inf_d1, inf_u2, inf_d2) and the conversion switch units (cvtf_u1, cvtf_d1, cvtf_u2, cvtf_d2) includes more than one transistor, a diode and a series resistor-capacitor connected in parallel. Each of the DC switch units (dsu11, dsu21, dsu12, dsu12, dsd11, dsd21, dsd12, dsd22) and the middle switch units (msu11, msu21, msu12, msu22, msd11, msd21, msd12, msd22) includes more than one transistor, a diode and a resistor connected in parallel. In the conversion module 31a, gate terminals of the transistors of the switch units (that is, the DC switch units dsu11, dsu21, dsd11, dsd21, the middle switch units msu11, msu21, msd11, msd21, the inner switch units inf_u1, inf_d1 and the conversion switch units cvtf_u1, cvtf_d1) receive the switch-control signals Ssw_g1 generated by the control circuit 33. Similarly, in the conversion module 31c, gate terminals of the transistors of the switch units (that is, the DC switch units dsu12, dsu22, dsd12, dsd22, the middle switch units msu12, msu22, msd12, msd22, the inner switch units inf_u2, inf_d2 and the conversion switch units cvtf_u2, cvtf_d2) receive the switch-control signals Ssw_g2 generated by the control circuit 33. During the process of converting the DC voltage (DC) into the AC voltage (AC) with the voltage-conversion module 31, the inductor L can smooth the current, and the capacitor C can smooth the voltage.

FIG. 4 gives a simplified drawing showing only one transistor in each switch unit. In real practice, each switch unit may include a plurality of transistors to withstand higher currents. Such modifications for various applications can be made without further explanation or details. In the description, the transistors used in the switch units are NMOS transistors, but are not limited to this kind of power transistors. The current direction in the transistor(s) is opposite to that in the diode in each switch unit. Table 3 shows the circuits and their corresponding switch units and the components of the switch units.

TABLE 3

| Circuit | Switch unit | Transistor | Diode | Resistor | Series resistor-capacitor |
|---|---|---|---|---|---|
| dcCKTu1 | dsu11, dsu21 | ≥2 | 1 | 1 | 0 |
| dcCKTu2 | dsu12, dsu22 | | | | |
| mCKTu1 | msu11, msu21 | | | | |
| mCKTu2 | msu12, msu22 | | | | |

TABLE 3-continued

| Circuit | Switch unit | Transistor | Diode | Resistor | Series resistor-capacitor |
|---|---|---|---|---|---|
| dcCKTd1 | dsd11, dsd21 | | | | |
| dcCKTd2 | dsd12, dsd22 | | | | |
| mCKTd1 | msd11, msd21 | | | | |
| mCKTd2 | msd12, msd22 | | | | |
| inCKTu1 | inf_u1 | | | | 1 |
| inCKTd1 | inf_u2 | | | | |
| inCKTu2 | inf_d1 | | | | |
| inCKTd2 | inf_d2 | | | | |
| vCKTu1 | cvtf_u1 | | | | |
| vCKTu2 | cvtf_u2 | | | | |
| vCKTd1 | cvtf_d1 | | | | |
| vCKTd2 | cvtf_d2 | | | | |

Figure 5:
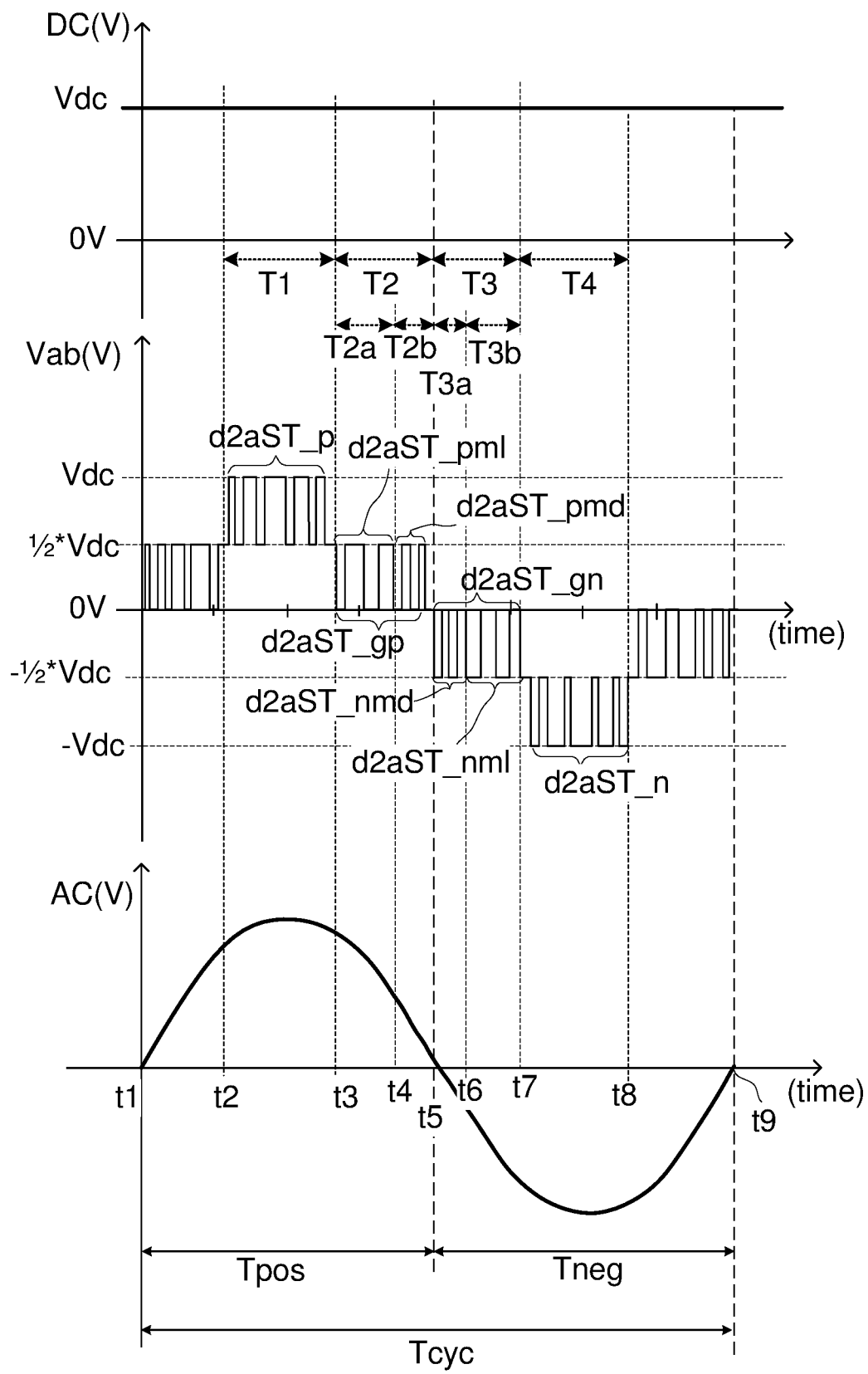
FIG. 5 shows waveforms of related signals when the voltage-conversion module converts the DC voltage into the AC voltage.

FIG. 5 shows waveforms of related signals when the voltage-conversion module converts the DC voltage (DC) into the AC voltage (AC). Please refer to both FIGS. 3 and 5. The battery module 41 provides the DC voltage (DC) having a constant positive DC voltage value Vdc. After the conversion modules 31a, 31c receive the DC voltage (DC), a modified sine wave Vab is generated between the conversion terminals Na, Nb. The modified sine wave Vab has PWM waveform property, and the voltage value is time-dependent. The filter circuit 38 filters the modified sine wave Vab, and then outputs the AC voltage (AC) at the AC terminals Np, Nn. In the disclosure, the symbols Va and Vb represent the voltages at the conversion terminals Na and Nb, respectively.

The waveforms in FIG. 5 are the DC voltage (DC), the modified sine wave Vab and the AC voltage (AC) in a top-to-bottom order. The pulse width of the modified sine wave Vab varies with the frequency of the carrier wave. According to the definition in the disclosure, the voltage of the modified sine wave Vab is the output voltage corresponding to the modified sine wave Vab. The DC voltage (DC) has a constant positive DC voltage value Vdc. The modified sine wave Vab and the AC voltage (AC) continue to rise from the ground voltage Gnd to the positive DC voltage value Vdc, decrease from the positive DC voltage value Vdc to the negative DC voltage value −Vdc, and rise from the negative DC voltage value −Vdc to the ground voltage Gnd cyclically.

One cycle Tcyc of the AC voltage (AC) is the interval between time points t1 and t9, wherein a duration between the time points t1, and t5 is defined as a positive half-cycle Tpos of the AC voltage (AC), and a duration between the time points t5 and t9 is defined as a negative half-cycle Tneg of the AC voltage (AC). The AC voltage (AC) is generated by filtering the modified sine wave Vab with the filter circuit 38, so the AC voltage (AC) and the modified sine wave Vab have an equal period, and the voltage of the AC voltage (AC) depends on the voltage of the modified sine wave Vab. According to the disclosure, when the voltage conversion device 3 is converting the DC voltage (DC) into the AC voltage (AC), the control circuit 33 determines the switch-control signals Ssw_g1, Ssw_g2 to control the switch units of the conversion modules 31a, 31c according to the voltage of the modified sine wave Vab.

According to the disclosure, during the dc-to-ac conversion process, the control circuit 33 controls the voltage-conversion module 31 in eight conversion states. The waveforms of the switch-control signals Ssw_g1, Ssw_g2 generated by the control circuit 33 and the combination of elements to be enabled in the voltage-conversion module 31 vary with the conversion states. Also, the modified sine wave Vab varies with the conversion states.

Subsequently, the dc-to-ac conversion process performed by the voltage-conversion module 31 is described in FIGS. 6A-6H. In these diagrams, no electrical signal passes through the elements in thinner lines. On the contrary, electrical signals pass through the elements in thicker lines, including the switch units receiving the switch-control signals Ssw_g1, Ssw_g2, and other elements having current flow therein. Therefore, the elements in thicker lines are in the selected current path, but the elements in thinner lines are not. The dashed arrows indicate the directions of the electrical signals. Table 4 briefly lists the voltage of the modified sine wave Vab and the corresponding time period in each conversion state.

TABLE 4

Figure 6A:
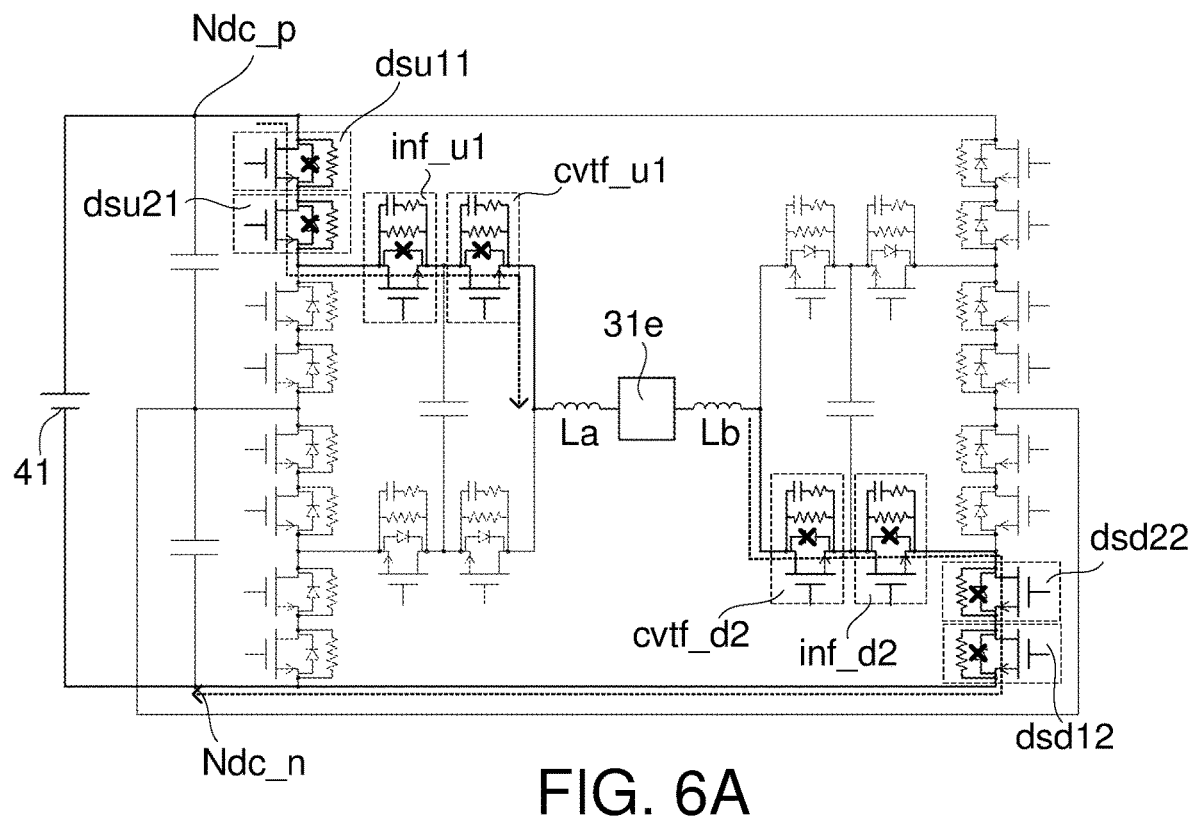
FIGS. 6A-6H are schematic diagrams illustrating the conversion states of the voltage-conversion module during the process of converting the DC voltage into the AC voltage.
Figure 6B:
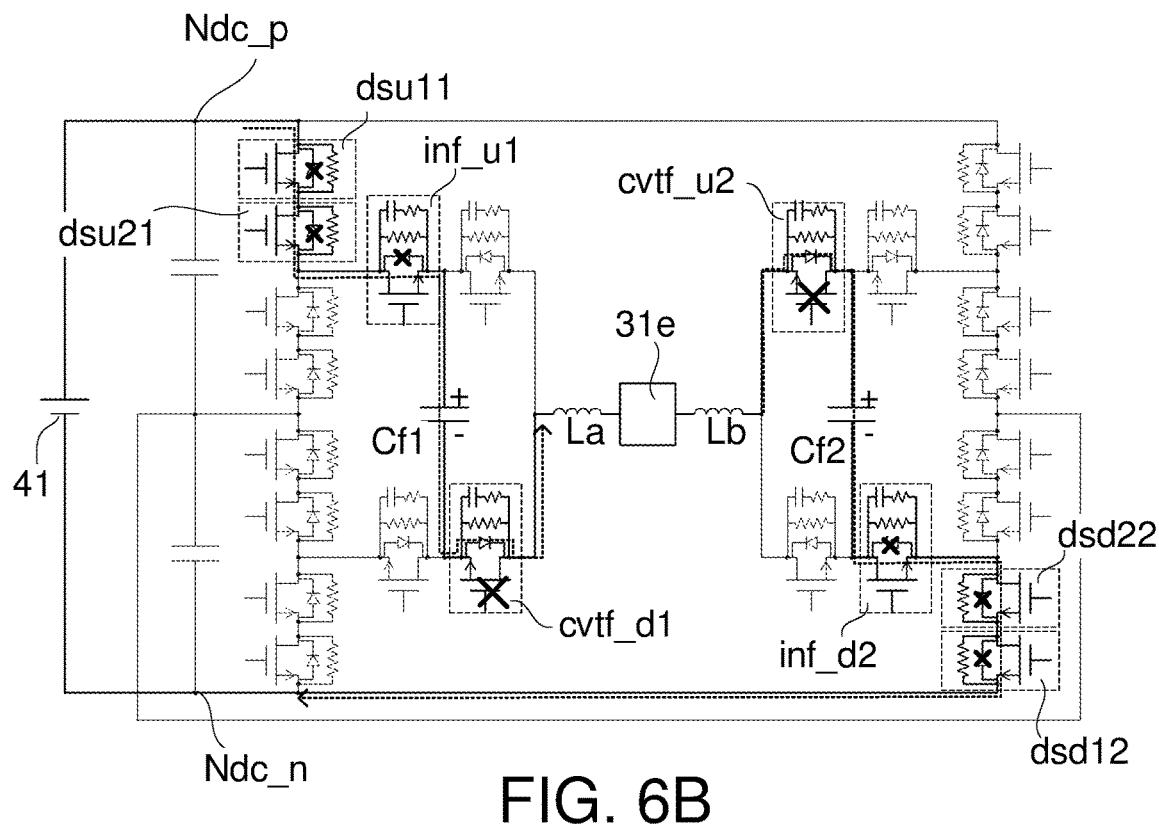
Figure 6C:
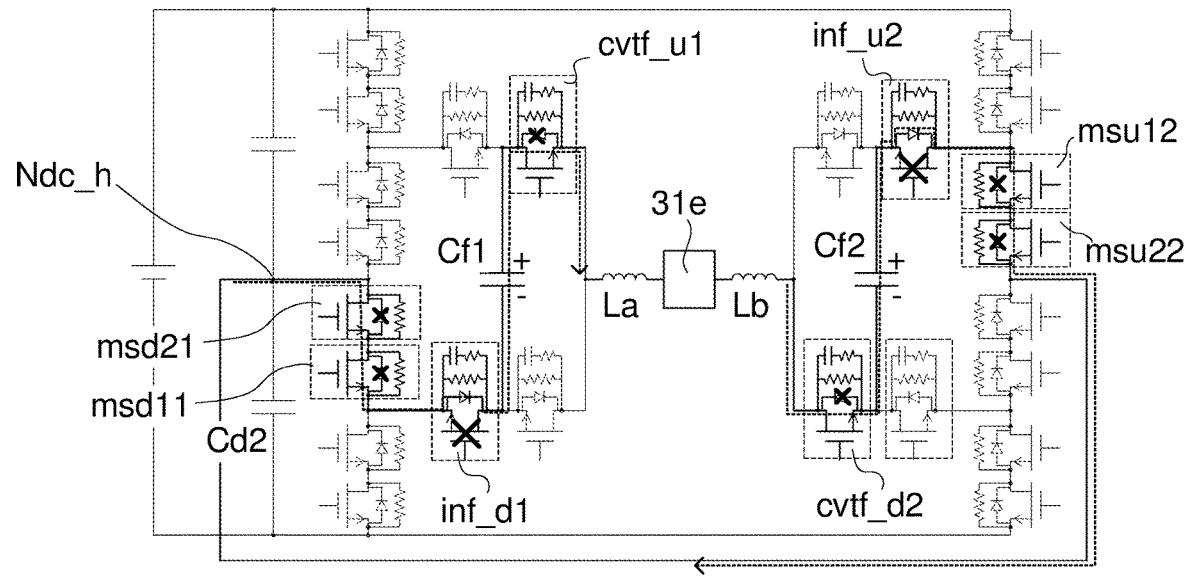
Figure 6D:
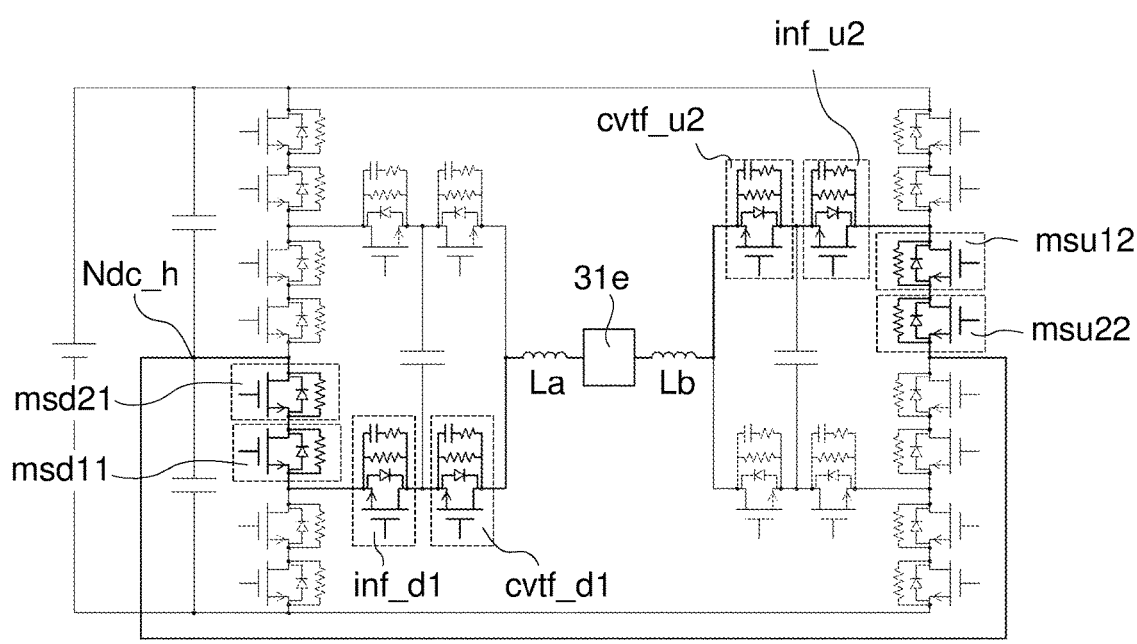
Figure 6E:
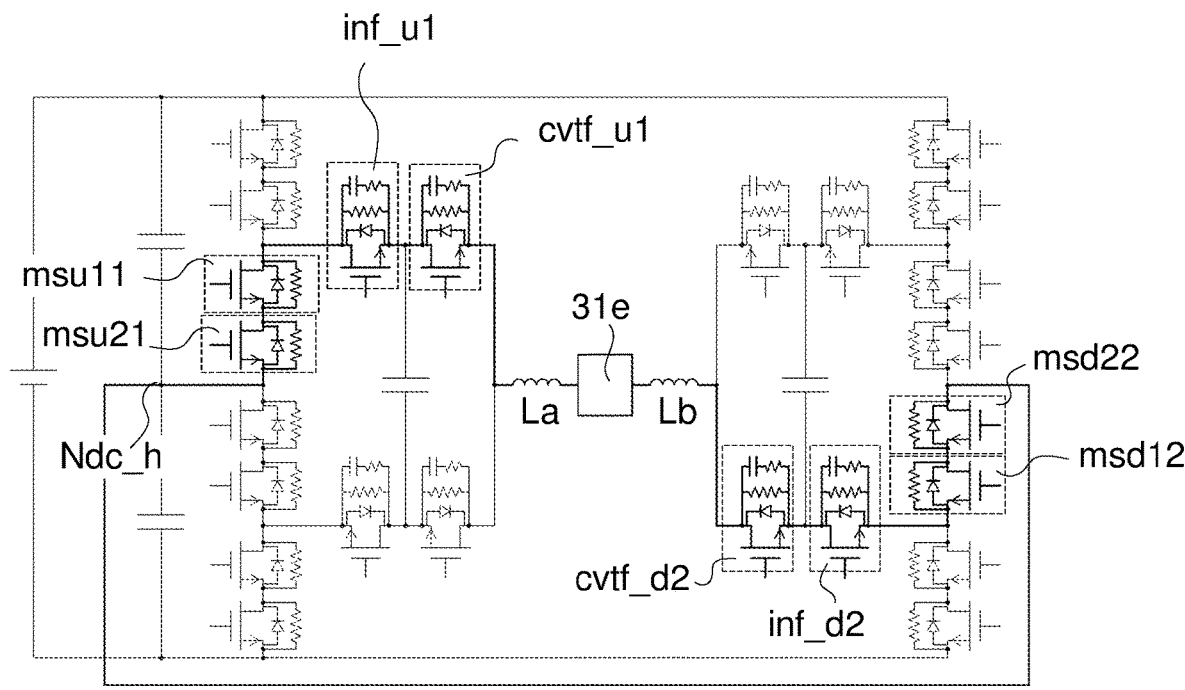
Figure 6F:
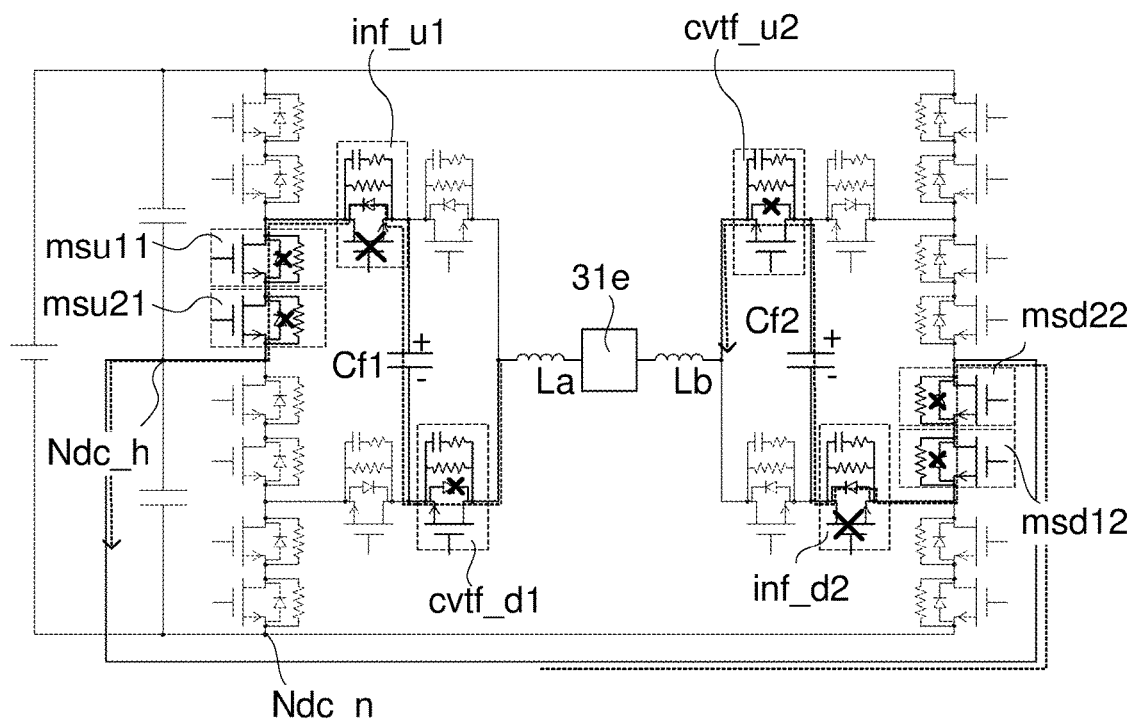
Figure 6G:
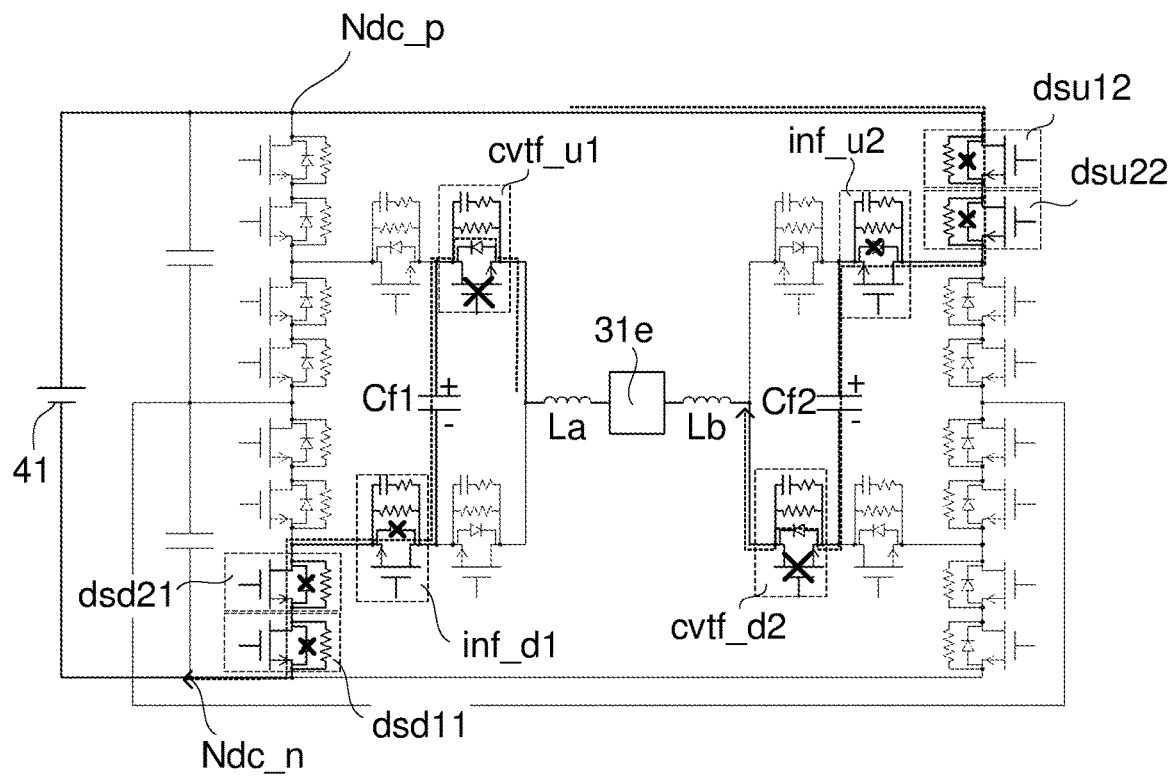
Figure 6H:
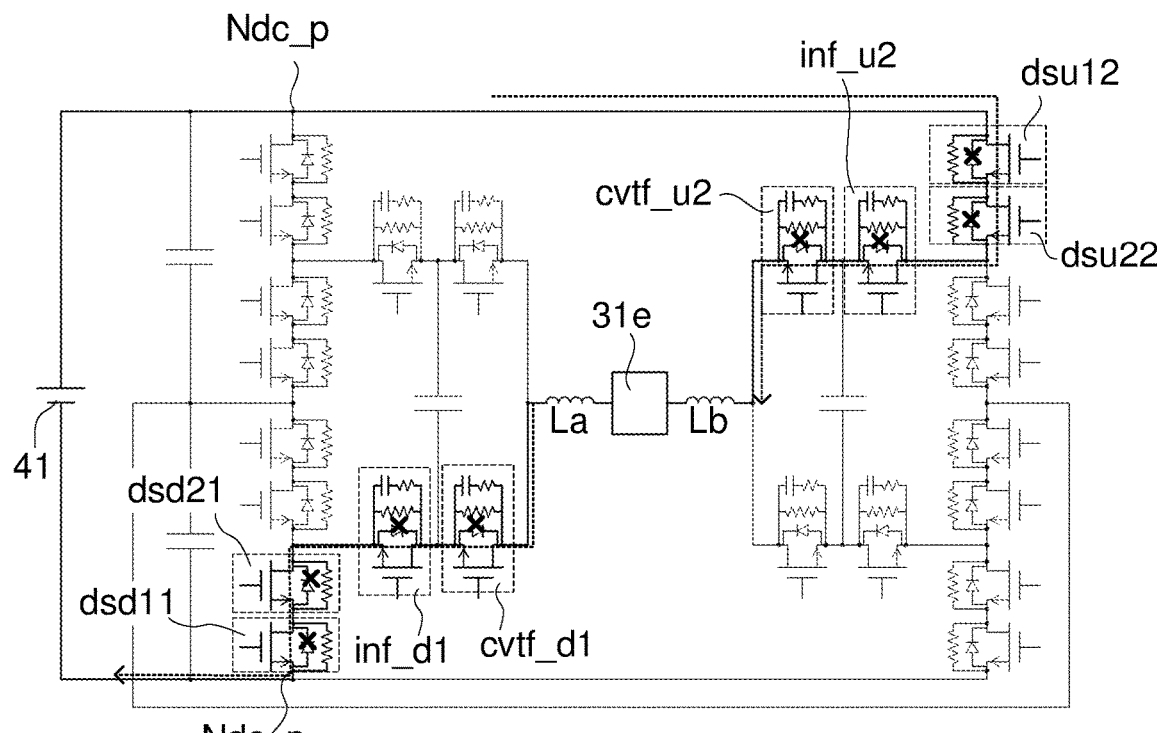

| Voltage of Vab | Conversion state of voltage-conversion module | FIG. | Time period |
|---|---|---|---|
| Vdc | First dc-to-ac conversion state d2aST_p | FIG. 6A | T1 (t2~t3) |
| ½ Vdc | Second dc-to-ac conversion state d2aST_pml | FIG. 6B | T2a (t3~t4) |
|  | Third dc-to-ac conversion state d2aST_pmd | FIG. 6C | T2b (t4~t5) |
| 0 V | Fourth dc-to-ac conversion state d2aST_gp | FIG. 6D | T2 (t3~t5) |
|  | Fifth dc-to-ac conversion state d2aST_gn | FIG. 6E | T3 (t5~t7) |
| −½ Vdc | Sixth dc-to-ac conversion state d2aST_nmd | FIG. 6F | T3a (t5~16) |
|  | Seventh dc-to-ac conversion state d2aST_nml | FIG. 6G | T3b (t6~t7) |
| −Vdc | Eighth dc-to-ac conversion state d2aST_n | FIG. 6H | T4 (t7~t8) |

The voltages of the modified sine wave Vab and the dc-to-ac conversion states of the voltage-conversion module 31 corresponding to the time periods between the time points t1 and t9 given in Table 4 will be described in FIGS. 6A-6H. The details of how the control circuit 33 controls the voltage-conversion module 31 between the time points t1 and t2 shown in FIG. 5 can be derived from the description regarding the time periods T2, T2a, T2b without further explanation. Similarly, the details of how the control circuit 33 controls the voltage-conversion module 31 between the time points t8 and t9 shown in FIG. 5 can be derived from the description regarding the time periods T3, T3a, T3b without further explanation.

The voltage-conversion module 31 enters the first dc-to-ac conversion state d2aST_p during the time period T1 in FIG. 5. Please refer to FIGS. 3, 5, 6A, and Table 4 together. In FIG. 6A, the control circuit 33 transmits the switch-control signals Ssw_g1 with a PWM waveform to the gate terminals of the transistors of the DC switch units dsu11, dsu21, the inner switch unit inf_u1, and the conversion switch unit cvtf_u1 of the conversion module 31a, and transmits the switch-control signals Ssw_g2 with a PWM waveform to the gate terminals of the transistors of the conversion switch unit cvtf_d2, the inner switch unit inf_d2 and the DC switch units dsd22, dsd12 of the conversion module 31c. The current can flow through these switch units receiving the switch-control signals Ssw_g1, Ssw_g2, and such switch units are called enabled switch units in the disclosure. Other non-mentioned switch units are switched off and disabled.

As shown in FIG. 6A, the current supplied by the battery module 41 sequentially flows through the DC voltage terminal Ndc_p, the transistors of the DC switch units dsu11, dsu21, the transistor of the inner switch unit inf_u1, the transistor of the conversion switch unit cvtf_u1, the inductor La, the filter circuit 31e, the inductor Lb, the transistor of the conversion switch unit cvtf_d2, the transistor of the inner switch unit inf_d2, the transistors of the DC switch units dsd22, dsd12, and the DC voltage terminal Ndc_n.

According to the current path corresponding to the first dc-to-ac conversion state d2aST_p, the voltage value of the modified sine wave Vab is equal to the voltage difference between the voltages at the DC voltage terminals Ndc_p and Ndc_n, as derived in equation (1).

$$Vab = Va - Vb \qquad (1)$$
$$= Ndc\_p - Ndc\_n$$
$$= Vdc$$

The voltage-conversion module 31 enters the second dc-to-ac conversion state d2aST_pml during the time period T2a in FIG. 5. Please refer to FIGS. 3, 5, 6B, and Table 4 together. In FIG. 6B, the control circuit 33 transmits the switch-control signals Ssw_g1 with a PWM waveform to the gate terminals of the transistors of the DC switch units dsu11, dsu21, the inner switch unit inf_u1, and the conversion switch unit cvtf_d1 of the conversion module 31a, and transmits the switch-control signals Ssw_g2 with a PWM waveform to the gate terminals of the transistors of the conversion switch unit cvtf_u2, the inner switch unit inf_d2 and the DC switch units dsd22, dsd12 of the conversion module 31c. Other non-mentioned switch units are switched off and disabled.

As shown in FIG. 6B, the current supplied by the battery module 41 sequentially flows through the DC voltage terminal Ndc_p, the transistors of the DC switch units dsu11, dsu21, the transistor of the inner switch unit inf_u1, the flying capacitor Cf1, the diode of the conversion switch unit cvtf_d1, the inductor La, the filter circuit 31e, the inductor Lb, the diode of the conversion switch unit cvtf_u2, the flying capacitor Cf2, the transistor of the inner switch unit inf_d2, the transistors of the DC switch units dsd22, dsd12, and the DC voltage terminal Ndc_n.

The current flows to and charges the flying capacitors Cf1, Cf2. The cross-voltage $V_{Cf1}$, $V_{Cf2}$ of each flying capacitor Cf1, Cf2 is equal to one-quarter of the positive DC voltage value Vdc $$\left( V_{Cf1} = V_{Cf2} = \frac{1}{4} Vdc \right).$$

According to the current path corresponding to the second dc-to-ac conversion state d2aST_pml, the voltage value of the modified sine wave Vab is equal to half the positive DC voltage value Vdc $$\left(Vab = \frac{1}{2}Vdc\right),$$

as derived in equation (2).

$$\begin{aligned}Vab &= Va - Vb \\ &= (\text{Ndc\_p} - V_{Cf1}) - (\text{Ndc\_n} + V_{Cf2}) \\ &= \left(\text{Ndc\_p} - \frac{1}{4}Vdc\right) - \left(\text{Ndc\_n} + \frac{1}{4}Vdc\right) \\ &= (\text{Ndc\_p} - \text{Ndc\_n}) - 2\left(\frac{1}{4}Vdc\right) \\ &= \frac{1}{2}Vdc\end{aligned} \quad (2)$$

It is shown that the current paths in FIGS. 6A and 6B are similar. Concretely speaking, in FIG. 6A, the DC switch units dsu11, dsu21, dsd22, dsd12, the inner switch units inf_u1, inf_d2 and the conversion switch units cvtf_u1, cvtf_d2 among the switch units receive the PWM signals. In FIG. 6B, the conversion switch units cvtf_d1, cvtf_u2, instead of the conversion switch units cvtf_u1, cvtf_d2, receive the PWM signals. Furthermore, the current does not flow to the flying capacitors Cf1, Cf2 in FIG. 6A, but flows to the flying capacitors Cf1, Cf2 in FIG. 6B. Therefore, the control circuit 33 can rapidly change the target switch units for receiving the PWM signals in response to the switching from the first dc-to-ac conversion state d2aST_p to the second dc-to-ac conversion state d2aST_pml. Hence, the conversion efficiency of the voltage conversion device 3 and the quality of the output waveforms are increased.

The voltage-conversion module 31 enters the third dc-to-ac conversion state d2aST_pmd during the time period T2b in FIG. 5. Please refer to FIGS. 3, 5, 6C, and Table 4 together. In FIG. 6C, the control circuit 33 transmits the switch-control signals Ssw_g1 with a PWM waveform to the gate terminals of the transistors of the middle switch units msd21, msd11, the inner switch unit inf_d1 and the conversion switch unit cvtf_u1 of the conversion module 31a, and transmits the switch-control signals Ssw_g2 with a PWM waveform to the gate terminals of the transistors of the conversion switch unit cvtf_d2, the inner switch unit inf_u2 and the middle switch units msu12, msu22 of the conversion module 31c. Other non-mentioned switch units are switched off and disabled.

As shown in FIG. 6C, the current from the voltage divider capacitor Cd2 sequentially flows through the half-DC voltage terminal Ndc_h, the transistors of the middle switch units msd21, msd11, the diode of the inner switch unit inf_d1, the flying capacitor Cf1, the transistor of the conversion switch unit cvtf_u1, the inductor La, the filter circuit 31e, the inductor Lb, the transistor of the conversion switch unit cvtf_d2, the flying capacitor Cf2, the diode of the inner switch unit inf_u2 and the transistors of the middle switch units msu12, msu22.

When the voltage-conversion module 31 is in the third dc-to-ac conversion state d2aST_pmd, the cross-voltage $V_{Cf1}$, $V_{Cf2}$ of each flying capacitor Cf1, Cf2 is equal to one-quarter of the positive DC voltage value Vdc $$\left(V_{Cf1} = V_{Cf2} = \frac{1}{4}Vdc\right).$$

At this time, the flying capacitors Cf1, Cf2 are discharged. According to the current path corresponding to the third dc-to-ac conversion state d2aST_pmd, the voltage value of the modified sine wave Vab is equal to half the positive DC voltage value Vdc $$\left(Vab = \frac{1}{2}Vdc\right),$$

as derived in equation (3).

$$\begin{aligned}Vab &= Va - Vb \\ &= \left(\text{Ndc\_h} + \frac{1}{4}Vdc\right) - \left(\text{Ndc\_h} - \frac{1}{4}Vdc\right) \\ &= \frac{1}{2}Vdc\end{aligned} \quad (3)$$

The voltage-conversion module 31 enters the fourth dc-to-ac conversion state d2aST_gp during the time period T2 in FIG. 5. Please refer to FIGS. 3, 5, 6D, and Table 4 together. In FIG. 6D, the control circuit 33 transmits the switch-control signals Ssw_g1 with a PWM waveform to the gate terminals of the transistors of the middle switch units msd21, msd11, the inner switch unit inf_d1 and the conversion switch unit cvtf_d1 of the conversion module 31a, and transmits the switch-control signals Ssw_g2 with a PWM waveform to the gate terminals of the transistors of the conversion switch unit cvtf_u2, the inner switch unit inf_u2 and the middle switch units msu12, msu22 of the conversion module 31c. Other non-mentioned switch units are switched off and disabled.

In the fourth dc-to-ac conversion state d2aST_gp, the middle switch units msd21, msd11, msu12, msu22, the inner switch units inf_d1, inf_u2, and the conversion switch units cvtf_d1, cvtf_u2 are switched on. At this time, the half-DC voltage terminal Ndc_h receives the ground voltage (Ndc_h=Gnd), and no current is generated in the conversion modules 31a, 31c. Therefore, the voltage value of the modified sine wave Vab is equal to the ground voltage Gnd, that is, Vab=Gnd.

Please refer to FIGS. 5 and 6B-6D together. The time period T2 is divided into the time periods T2a and T2b. The conversion state of the voltage-conversion module 31 in FIG. 6B presents, within the time period T2a; the conversion state of the voltage-conversion module 31 in FIG. 6C presents within the time period T2b; and the conversion state of the voltage-conversion module 31 in FIG. 6D presents within the time period T2. During the time period T2a, the voltage-conversion module 31 is switched between the second dc-to-ac conversion state d2aST_pml and the fourth dc-to-ac conversion state d2aST_gp. During the time period T2b, the voltage-conversion module 31 is switched between the third dc-to-ac conversion state d2aST_pmd and the fourth dc-to-ac conversion state d2aST_gp.

It is to be noted that although the voltage value of the modified sine wave Vab alternates between half the positive DC voltage value Vdc $$\left(Vab = \frac{1}{2}Vdc\right)$$

and the ground voltage (Vab=Gnd) in both of the time periods T2*a* and T2*b*, the control circuit 33 transmits the switch-control signals Ssw_g1, Ssw_g2 with different PWM waveforms to the conversion modules 31*a*, 31*c* in different dc-to-ac conversion states (that is, the second dc-to-ac conversion state d2*a*ST_pml and the third dc-to-ac conversion state d2*a*ST_pmd). The pulse width of the modified sine wave Vab in the time period T2*a* is different from that in the time period T2*b*.

The voltage-conversion module 31 enters the fifth dc-to-ac conversion state d2*a*ST_gn during the time period T3 in FIG. 5. Please refer to FIGS. 3, 5, 6E, and Table 4 together. In FIG. 6E, the control circuit 33 transmits the switch-control signals Ssw_g1 with a PWM waveform to the gate terminals of the transistors of the middle switch units msu21, msu11, the inner switch unit inf_u1 and the conversion switch unit cvtf_u1 of the conversion module 31*a*, and transmits the switch-control signals Ssw_g2 with a PWM waveform to the gate terminals of the transistors of the conversion switch unit cvtf_d2, the inner switch unit inf_d2 and the middle switch units msd12, msd22 of the conversion module 31*c*. Other non-mentioned switch units are switched off and disabled.

In the fifth dc-to-ac conversion state d2*a*ST_gn, the middle switch units msd12, msd22, msu11, msu21, the inner switch units inf_d2, inf_u1, and the conversion switch units cvtf_d2, cvtf_u1 are switched on. At this time, the voltage of half-DC voltage terminal Ndc_h is equal to the ground voltage (Ndc_h=Gnd), so no current is generated in the conversion modules 31*a*, 31*c*. Therefore, the voltage value of the modified sine wave Vab is equal to the ground voltage Gnd, that is, Vab=Gnd.

The voltage-conversion module 31 enters the sixth dc-to-ac conversion state d2*a*ST_nmd during the time period T3*a* in FIG. 5. Please refer to FIGS. 3, 5, 6F, and Table 4 together. In FIG. 6F, the control circuit 33 transmits the switch-control signals Ssw_g1 with a PWM waveform to the gate terminals of the transistors of the middle switch units msu21, msu11, the inner switch unit inf_u1 and the conversion switch unit cvtf_d1 of the conversion module 31*a*, and transmits the switch-control signals Ssw_g2 with a PWM waveform to the gate terminals of the transistors of the conversion switch unit cvtf_u2, the inner switch unit inf_d2 and the middle switch units msd12, msd22 of the conversion module 31*c*. Other non-mentioned switch units are switched off and disabled.

As shown in FIG. 6F, the current from the voltage divider capacitor Cd1 sequentially flows through the half-DC voltage terminal Ndc_h, the transistors of the middle switch units msd22, msd12, the diode of the inner switch unit inf_d2, the flying capacitor Cf2, the transistor of the conversion switch unit cvtf_u2, the inductor Lb, the filter circuit 31*e*, the inductor La, the transistor of the conversion switch unit cvtf_d1, the flying capacitor Cf1, the diode of the inner switch unit inf_u1 and the transistors of the middle switch units msu11, msu21.

When the voltage-conversion module 31 is in the sixth dc-to-ac conversion state d2*a*ST_nmd, the cross-voltage $V_{Cf1}$, $V_{Cf2}$ of each flying capacitor Cf1, Cf2 is equal to one-quarter of the positive DC voltage value Vdc $$\left(V_{Cf1} = V_{Cf2} = \frac{1}{4}Vdc\right).$$

At this time, the flying capacitors Cf1, Cf2 are discharged. According to the current path corresponding to the sixth dc-to-ac conversion state d2*a*ST_nmd, the voltage value of the modified sine wave Vab is equal to half the negative DC voltage value −Vdc $$\left(Vab = -\frac{1}{2}Vdc\right),$$

as derived in equation (4).

$$\begin{aligned} Vab &= Va - Vb \\ &= \left(Ndc_h - \frac{1}{4}Vdc\right) - \left(Ndc_h + \frac{1}{4}Vdc\right) \\ &= -\frac{1}{2}Vdc \end{aligned} \quad (4)$$

The voltage-conversion module 31 enters the seventh dc-to-ac conversion state d2*a*ST_nml during the time period T3*b* in FIG. 5. Please refer to FIGS. 3, 5, 6G, and Table 4 together. In FIG. 6G, the control circuit 33 transmits the switch-control signals Ssw_g1 with a PWM waveform to the gate terminals of the transistors of the DC switch units dsd11, dsd21, the inner switch unit inf_d1, and the conversion switch unit cvtf_u1 of the conversion module 31*a*, and transmits the switch-control signals Ssw_g2 with a PWM waveform to the gate terminals of the transistors of the conversion switch unit cvtf_d2, the inner switch unit inf_u2 and the DC switch units dsu22, dsu12 of the conversion module 31*c*. Other non-mentioned switch units are switched off and disabled.

As shown in FIG. 6G, the current supplied by the battery module 41 sequentially flows through the DC voltage terminal Ndc_p, the transistors of the DC switch units dsu12, dsu22, the transistor of the inner switch unit inf_u2, the flying capacitor Cf2, the diode of the conversion switch unit cvtf_d2, the inductor Lb, the filter circuit 31*e*, the inductor La, the diode of the conversion switch unit cvtf_u1, the flying capacitor Cf1, the transistor of the inner switch unit inf_d1, the transistors of the DC switch units dsd21, dsd11, and the DC voltage terminal Ndc_n.

The current flows to and charges the flying capacitors Cf1, Cf2. The cross-voltage $V_{Cf1}$, $V_{Cf2}$ of each flying capacitor Cf1, Cf2 is equal to one-quarter of the positive DC voltage value Vdc $$\left(V_{Cf1} = V_{Cf2} = \frac{1}{4}Vdc\right).$$

At this time, the flying capacitors Cf1, Cf2 are charging. According to the current path corresponding to the seventh dc-to-ac conversion state d2*a*ST_nml, the voltage value of the modified sine wave Vab is equal to half the negative DC voltage value −Vdc $$\left(Vab = -\frac{1}{2}Vdc\right),$$

as derived in equation (5).

$$\begin{aligned}Vab &= Va - Vb \\ &= (\text{Ndc\_n} + V_{Cf2}) - (\text{Ndc\_p} - V_{Cf1}) \\ &= \left(Ndc_n + \frac{1}{4}Vdc\right) - \left(\text{Ndc\_p} - \frac{1}{4}Vdc\right) \\ &= (\text{Ndc\_n} - \text{Ndc\_p}) + 2\left(\frac{1}{4}Vdc\right) \\ &= -\frac{1}{2}Vdc\end{aligned} \quad (5)$$

Please refer to FIGS. 5 and 6E-6G together. The time period T3 is divided into the time periods T3a and T3b. The conversion state of the voltage-conversion module 31 in FIG. 6E presents, within the time period T3; the conversion state of the voltage-conversion module 31 in FIG. 6F presents within the time period T3a; and the conversion state of the voltage-conversion module 31 in FIG. 6G presents within the time period T3b. During the time period T3a, the voltage-conversion module 31 is switched between the sixth dc-to-ac conversion state d2aST_nmd and the fifth dc-to-ac conversion state d2aST_gn. During the time period T3b, the voltage-conversion module 31 is switched between the seventh dc-to-ac conversion state d2aST_nml and the fifth dc-to-ac conversion state d2aST_gn.

It is to be noted that although the voltage value of the modified sine wave Vab alternates between half the negative DC voltage value −Vdc $$\left(Vab = -\frac{1}{2}Vdc\right)$$

and the ground voltage (Vab=Gnd) in both of the time periods T3a and T3b, the control circuit 33 transmits the switch-control signals Ssw_g1, Ssw_g2 with different PWM waveforms to the conversion modules 31a, 31c in different dc-to-ac conversion states (that is, the sixth dc-to-ac conversion state d2aST_nmd and the seventh dc-to-ac conversion state d2aST_nml). The pulse width of the modified sine wave Vab in the time period T3a is different from that in the time period T3b.

The voltage-conversion module 31 enters the eighth dc-to-ac conversion state d2aST_n during the time period T4 in FIG. 5. Please refer to FIGS. 3, 5, 6H, and Table 4 together. In FIG. 6H, the control circuit 33 transmits the switch-control signals Ssw_g1 with a PWM waveform to the gate terminals of the transistors of the DC switch units dsd11, dsd21, the inner switch unit inf_d1, and the conversion switch unit cvtf_d1 of the conversion module 31a, and transmits the switch-control signals Ssw_g2 with a PWM waveform to the gate terminals of the transistors of the conversion switch unit cvtf_u2, the inner switch unit inf_u2 and the DC switch units dsu22, dsu12 of the conversion module 31c. Other non-mentioned switch units are switched off and disabled.

As shown in FIG. 6H, the current supplied by the battery module 41 sequentially flows through the DC voltage terminal Ndc_p, the transistors of the DC switch units dsu12, dsu22, the transistor of the inner switch unit inf_u2, the transistor of the conversion switch unit cvtf_u2, the inductor Lb, the filter circuit 31e, the inductor La, the transistor of the conversion switch unit cvtf_d1, the transistor of the inner switch unit inf_d1, the transistors of the DC switch units dsd21, dsd11, and the DC voltage terminal Ndc_n.

According to the current path corresponding to the eighth dc-to-ac conversion state d2aST_n, the voltage value of the modified sine wave Vab is equal to the voltage difference between the voltages at the DC voltage terminals Ndc_n and Ndc_p, as derived in equation (6).

$$\begin{aligned}Vab &= Va - Vb \\ &= \text{Ndc\_n} - \text{Ndc\_p} \\ &= -Vdc\end{aligned} \quad (6)$$

It is shown that the current paths in FIGS. 6G and 6H are similar. Concretely speaking, in FIG. 6G, the DC switch units dsu12, dsu22, dsd21, dsd11, the inner switch units inf_u2, inf_d1 and the conversion switch units cvtf_d2, cvtf_u1 among the switch units receive the PWM signals. In FIG. 6H, the conversion switch units cvtf_u2, cvtf_d1, instead of the conversion switch units cvtf_d2, cvtf_u1, receive the PWM signals. Furthermore, the current flows to the flying capacitors Cf1, Cf2 in FIG. 6G, but does not flow to the flying capacitors Cf1, Cf2 in FIG. 6H. Therefore, the control circuit 33 can rapidly change the target switch units for receiving the PWM signals in response to the switching from the seventh dc-to-ac conversion state d2aST_nml to the eighth dc-to-ac conversion state d2aST_n. Hence, the conversion efficiency of the voltage conversion device 3 and the quality of the output waveforms are increased.

Comparing FIGS. 6A and 6H, viewed from the positions of the switch units, the arrangement of the enabled switch units (receiving the PWM signal) in the conversion module 31a in FIG. 6A is a mirror image of the arrangement of the enabled switch units (receiving the PWM signal) in the conversion module 31c in FIG. 6H. Similarly, the arrangement of the enabled switch units (receiving the PWM signal) in the conversion module 31c in FIG. 6A is a mirror image of the arrangement of the enabled switch units (receiving the PWM signal) in the conversion module 31a in FIG. 6H. Such mirror copy arrangement of the enabled switch units in the conversion modules 31a, 31c can be observed in FIGS. 6B vs. 6G, FIGS. 6C vs. 6F, and FIGS. 6D vs. 6E.

Please see Table 5 showing, based on the above description with reference to FIGS. 5 and 6A-6H, that the control circuit 33 selects the current paths in the conversion modules 31a, 31c according to the voltage value of the modified sine wave Vab when the voltage conversion device 3 is converting the DC voltage (DC) into the AC voltage (AC).

TABLE 5

| FIG. | Conversion state of voltage-conversion module | Conversion module 31a — DC stage circuit: DC circuit | Middle circuit | Inner stage circuit | flying capacitor | Conversion stage circuit | Conversion module 31c — Conversion stage circuit | flying capacitor | Inner stage circuit | Middle circuit | DC stage circuit: DC circuit |
|---|---|---|---|---|---|---|---|---|---|---|---|
| FIG. 6A | d2aST_p | dcCKTu1 | — | inCKTu1 | — | vCKTu1 | vCKTd2 | — | inCKTd2 | — | dcCKTd2 |
| FIG. 6B | d2aST_pml | | | | Cf1 charging | vCKTd1 | vCKTu2 | Cf2 charging | | | |
| FIG. 6C | d2aST_pmd | — | mCKTd1 | inCKTd1 | Cf1 discharging | vCKTu1 | vCKTd2 | Cf2 discharging | inCKTu2 | mCKTu2 | — |
| FIG. 6D | d2aST_gp | | | | — | vCKTd1 | vCKTu2 | — | | | |
| FIG. 6E | d2aST_gn | | mCKTu1 | inCKTu1 | | vCKTu1 | vCKTd2 | | inCKTd2 | mCKTd2 | |
| FIG. 6F | d2aST_nmd | | | | Cf1 discharging | vCKTd1 | vCKTu2 | Cf2 discharging | | | |
| FIG. 6G | d2aST_nml | dcCKTd1 | — | inCKTd1 | Cf1 charging | vCKTu1 | vCKTd2 | Cf2 charging | inCKTu2 | — | dcCKTu2 |
| FIG. 6H | d2aST_n | | | | — | vCKTd1 | vCKTu2 | — | | | |

From Table 5, the PWM signals are transmitted to different switch units (enabled switch units) in different dc-to-ac conversion states. The enabled switch units in respective paths are analyzed as follows.

Regarding the upper/lower DC circuits of the DC stage circuits, the upper DC circuit dcCKTu1 or the lower DC circuit dcCKTd1 of the conversion module 31a and the upper DC circuit dcCKTu2 or the lower DC circuit dcCKTd2 of the conversion module 31c receive the corresponding PWM signals just in the first dc-to-ac conversion state d2aST_p, the second dc-to-ac conversion state d2aST_pml, the seventh dc-to-ac conversion state d2aST_nml, and the eighth dc-to-ac conversion state d2aST_n. Regarding the upper/lower middle circuits of the DC stage circuits, the upper middle circuit mCKTu1 or the lower middle circuit mCKTd1 of the conversion module 31a and the upper middle circuit mCKTu2 or the lower middle circuit mCKTd2 of the conversion module 31c receive the corresponding PWM signals just in the third dc-to-ac conversion state d2aST_pmd, the fourth dc-to-ac conversion state d2aST_gp, the fifth dc-to-ac conversion state d2aST_gn, and the sixth dc-to-ac conversion state d2aST_nmd. Furthermore, it is observed from Table 5 that only one of the upper DC circuit, the lower DC circuit, the upper middle circuit, and the lower middle circuit in the same DC stage circuit receives the corresponding PWM signal in one dc-to-ad conversion state.

Regarding the upper/lower inner circuits of the inner stage circuits, the upper inner circuit inCKTu1 of the conversion module 31a and the lower inner circuit inCKTd2 of the conversion module 31c receive the corresponding PWM signals in the same dc-to-ac conversion state; and the lower inner circuit inCKTd1 of the conversion module 31a and the upper inner circuit inCKTu2 of the conversion module 31c receive the corresponding PWN signals in the same dc-to-ac conversion state. Further, the upper inner circuit inCKTu1 of the conversion module 31a and the upper inner circuit inCKTu2 of the conversion module 31c do not receive the corresponding PWM signals in the same dc-to-ac conversion state; and the lower inner circuit inCKTd1 of the conversion module 31a and the lower inner circuit inCKTd2 of the conversion module 31c do not receive the corresponding PWM signals in the same dc-to-ac conversion state.

Regarding the upper/lower conversion circuits of the conversion stage circuits, the upper conversion circuit vCKTu1 of the conversion module 31a and the lower conversion circuit vCKTd2 of the conversion module 31c receive the corresponding PWM signals in the same dc-to-ac conversion state; and the lower conversion circuit vCKTd1 of the conversion module 31a and the upper conversion circuit vCKTu2 of the conversion module 31c receive the corresponding PWM signals in the same dc-to-ac conversion state. Further, the upper conversion circuit vCKTu1 of the conversion module 31a and the upper conversion circuit vCKTu2 of the conversion module 31c do not receive the corresponding PWM signals in the same dc-to-ac conversion state; and the lower conversion circuit vCKTd1 of the conversion module 31a and the lower conversion circuit vCKTd2 of the conversion module 31c do not receive the corresponding PWM signals in the same dc-to-ac conversion state.

It is also observed from Table 5 that the control circuit 33 selects the circuits according to different rules in the conversion states. For example, the control circuit 33 changes the selected conversion circuits between two adjacent dc-to-ac conversion states in adjacent rows. The control circuit 33 controls the upper conversion circuit vCKTu1 and the lower conversion circuit vCKTd2 to be in the connection mode in the first dc-to-ac conversion state d2aST_p, the third dc-to-ac conversion state d2aST_pmd, the fifth dc-to-ac conversion state 2aST_gn, and the seventh dc-to-ac conversion state d2aST_nml. Alternatively, the control circuit 33 controls the lower conversion circuit vCKTd1 and the upper conversion circuit vCKTu2 to be in the connection mode in the second dc-to-ac conversion state d2aST_pml, the fourth dc-to-ac conversion state d2aST_gp, the sixth dc-to-ac conversion state d2aST_nmd, and the eighth dc-to-ac conversion state d2aST_n.

The control circuit 33 changes the selected inner circuits every two rows of the dc-to-ac conversion states. The control circuit 33 controls the upper inner circuit inCKTu1 and the lower inner circuit inCKTd2 to be in the connection mode in the first dc-to-ac conversion state d2aST_p, the second dc-to-ac conversion state d2aST_pml, the fifth dc-to-ac conversion state d2aST_gn, and the sixth dc-to-ac conversion state d2aST_nmd. Alternatively, the control circuit 33 controls the lower inner circuit inCKTd1 and the upper inner circuit inCKTu2 to be in the connection mode in the third dc-to-ac conversion state d2aST_pmd, the fourth dc-to-ac conversion state d2aST_gp, the seventh dc-to-ac conversion state d2aST_nml, and the eighth dc-to-ac conversion state d2aST_n.

The DC circuits and the middle circuits are the least selected. The control circuit 33 controls the upper DC circuit dcCKTu1 and the lower DC circuit dcCKTd2 to be in the connection mode just in the first dc-to-ac conversion state d2aST_p and the second dc-to-ac conversion state d2aST_pml; and the control circuit 33 controls the upper DC circuit dcCKTu2 and the lower DC circuit dcCKTd1 to be in the connection mode just in the seventh dc-to-ac conversion state d2aST_nml and the eighth dc-to-ac conversion state d2aST_n. Alternatively, the control circuit 33 controls the upper middle circuit mCKTu2 and the lower middle circuit mCKTd1 to be in the connection mode just in the third dc-to-ac conversion state d2aST_pmd and the fourth dc-to-ac conversion state d2aST_gp; and the control circuit 33 controls the upper middle circuit mCKTu1 and the lower middle circuit mCKTd2 to be in the connection mode just in the fifth dc-to-ac conversion state d2aST_gn and the sixth dc-to-ac conversion state d2aST_nmd.

The upper conversion circuit and the lower conversion circuit of the same conversion stage circuit alternately receive the corresponding PWM signal in the dc-to-ac conversion states. The upper DC circuit, lower DC circuit, upper middle circuit, and the lower middle circuit of the same DC stage circuit receive the corresponding PWM signals in respective two of the dc-to-ac conversion states, but any two of the upper DC circuit, lower DC circuit, upper middle circuit and the lower middle circuit of the same DC stage circuit do not receive the corresponding PWM signals in the same dc-to-ac conversion state.

Figure 7:
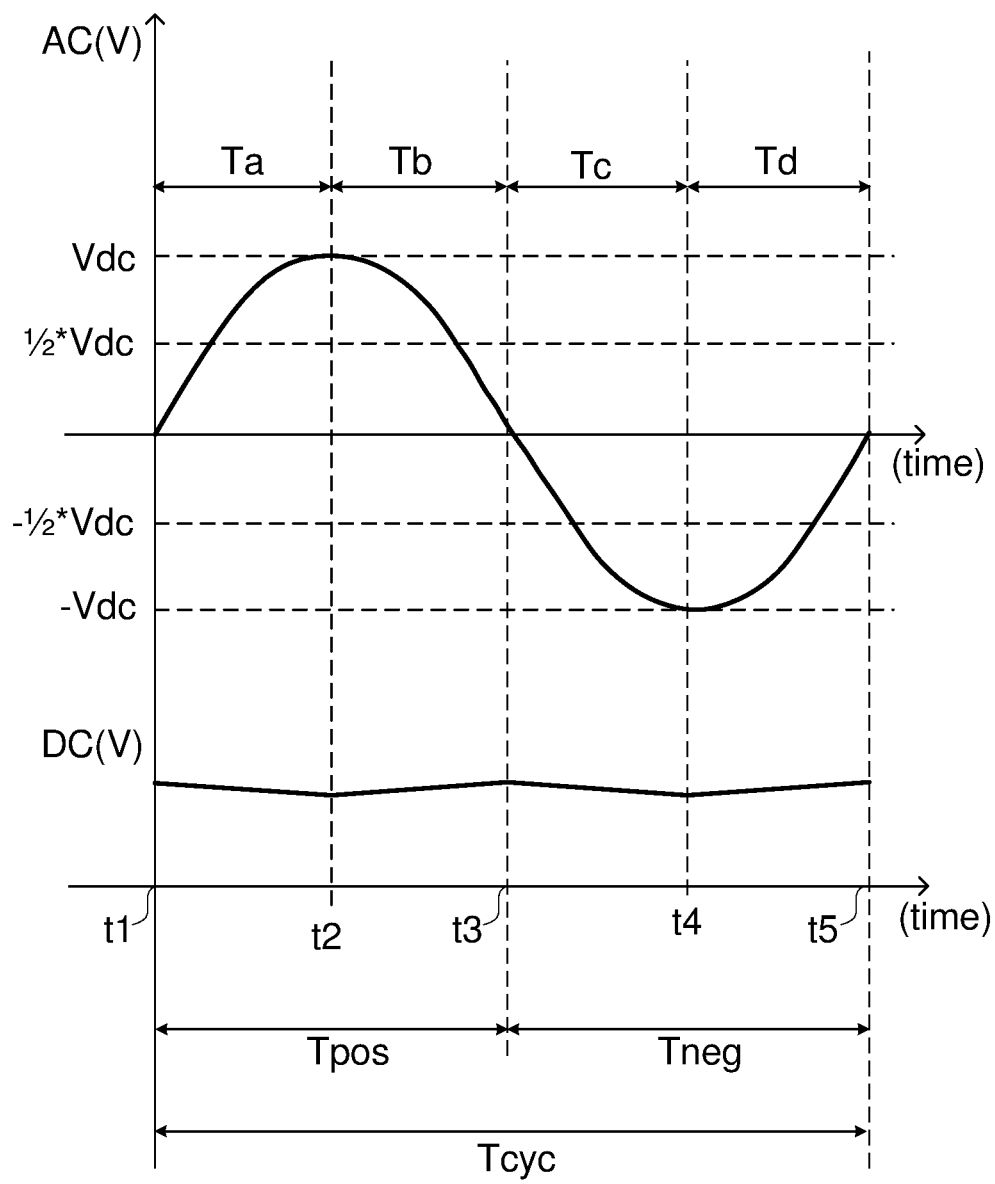
FIG. 7 shows waveforms of related signals when the voltage-conversion module converts the AC voltage into the DC voltage.

FIGS. 5 and 6A-6H and the related description have explained how the voltage conversion device 3 converts the DC voltage (DC) supplied by the battery module 41 into the AC voltage (AC) to be transmitted to the loading 43. The following description with FIGS. 7 and 8A-8D will explain how the voltage conversion device 3 converts the AC voltage (AC) provided by the loading 43 into the DC voltage (DC) to be provided to the battery module 41. FIG. 7 is a waveform diagram showing waveforms of related signals when the voltage-conversion module 31 converts the AC voltage (AC) into the DC voltage (DC). The waveform in the upper portion depicts the AC voltage (AC) provided by the loading 43; and the waveform in the lower portion depicts the DC voltage (DC) generated by the voltage-conversion module 31.

One cycle Tcyc of the AC voltage (AC) is represented by the interval between the time points t1 and t5, wherein a positive half-cycle Tpos of the AC voltage (AC) is defined between the time points t1 and t3, and a negative half-cycle Tneg of the AC voltage (AC) is defined between the time points t3 and t5. The positive half-cycle Tpos of the AC voltage (AC) includes the time periods Ta, Tb; and the negative half-cycle Tneg of the AC voltage (AC) includes the time periods Tc, Td. The AC voltage (AC) rises from the ground voltage 0V to the positive DC voltage value Vdc during the time period Ta, decreases from the positive DC voltage value Vdc to the ground voltage 0V during the time period Tb, decreases from the ground voltage 0V to the negative DC voltage value −Vdc during the time period Tc, and rises from the negative DC voltage value −Vdc to the ground voltage 0V during the time period Td. Table 6 briefly lists the voltage of the AC voltage (AC) and the corresponding time period in each conversion state.

TABLE 6

Figure 8A:
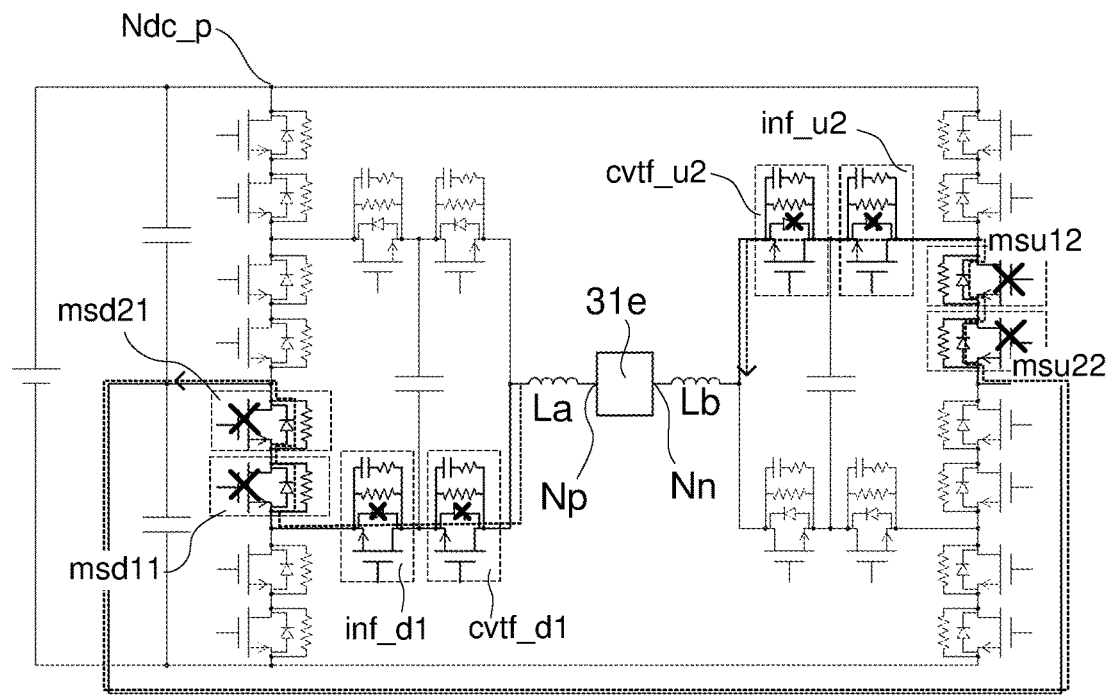
FIGS. 8A-8D are schematic diagrams illustrating the conversion states of the voltage-conversion module during the process of converting the AC voltage into the DC voltage.
Figure 8B:
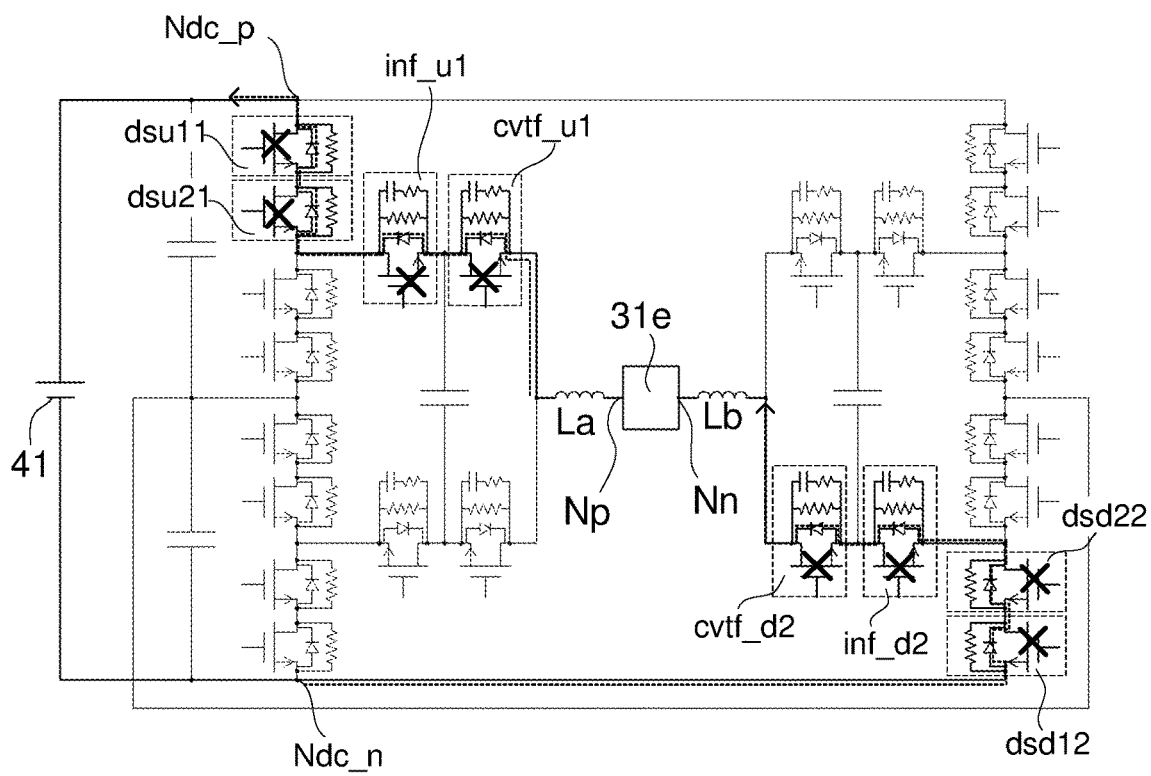
Figure 8C:
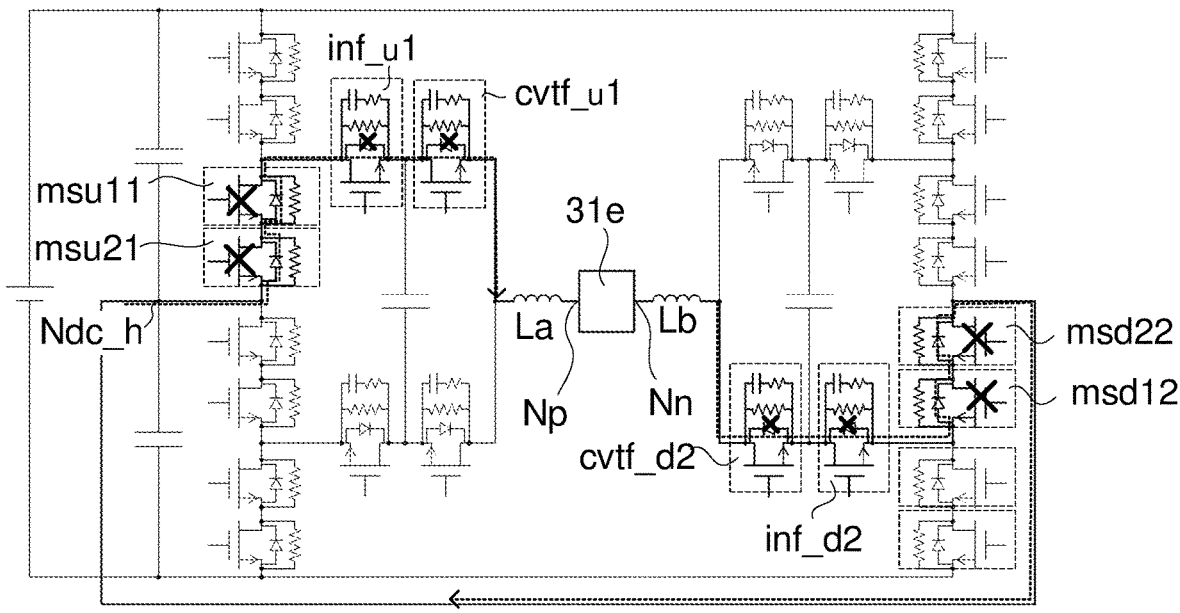
Figure 8D:
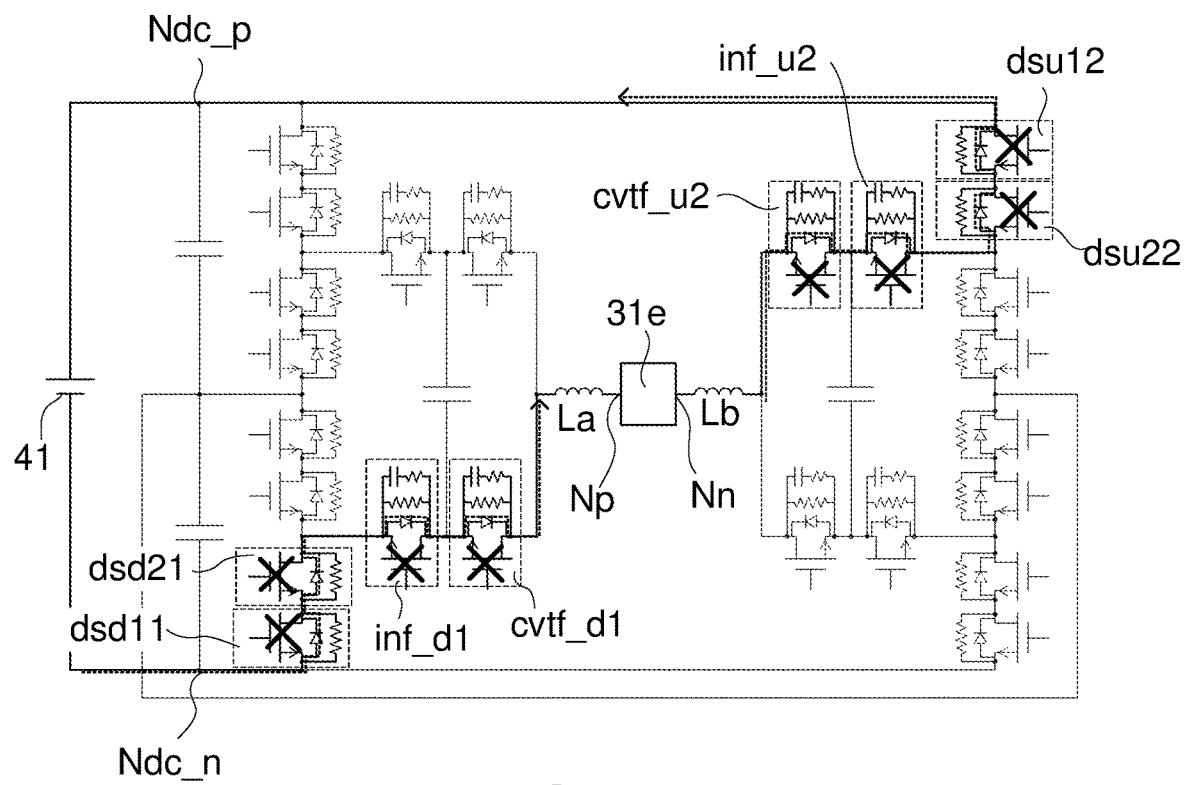

| Half-cycle of AC | Voltage of AC | Conversion state | FIG. | Time period |
|---|---|---|---|---|
| Positive half-cycle Tpos | 0 V −> Vdc rising | First ac-to-dc conversion state a2dST_gp | FIG. 8A | Ta (t1~t2) |
| | Vdc −> 0 V decreasing | Second ac-to-dc conversion state a2dST_pg | FIG. 8B | Tb (t2~t3) |
| Negative half-cycle Tneg | 0 V −> −Vdc decreasing | Third ac-to-dc conversion state a2dST_gn | FIG. 8C | Tc (t3~t4) |
| | −Vdc −> 0 V rising | Fourth ac-to-dc conversion state a2dST_ng | FIG. 8D | Td (t4~t5) |

Please refer to FIGS. 2 and 7 together. As described above, when the voltage conversion device 3 converts the AC voltage (AC) into the DC voltage (DC), the control circuit 33 controls the conversion modules 31a, 31c according to the voltage value of the AC voltage (AC). The detection circuit 38 detects the AC voltage (AC) at the AC terminals Np, Nn and transmits the detection result to the control circuit 33. Then, the control circuit 33 decides the PWM waveforms of the switch-control signals Ssw_g1, Ssw_g2 based on the conversion states of the voltage-conversion module 31 according to the detection results provided by the detection circuit 38 and the information in the lookup table stored in the storage circuit 35.

Subsequently, the ac-to-dc conversion process performed by the voltage-conversion module 31 is described in FIGS. 8A-8H. In these diagrams, elements in thinner lines include the switch units which do not receive the switch-control signals Ssw_g1, Ssw_g2, and the elements having no current flow therein. On the contrary, the elements in thicker lines include the switch units receiving the switch-control signals Ssw_g1, Ssw_g2, and other elements having current flow therein. Therefore, the elements in thicker lines are in the selected current path, but the elements in thinner lines are not. The dashed arrows indicate the directions of the current in the conversion states.

Please refer to FIGS. 3, 7, 8A, and Table 6 together. The first ac-to-dc conversion state a2dST_gp in FIG. 8A corresponds to the time period Ta in FIG. 7. During the procedure when the AC voltage (AC) is rising from the ground voltage Gnd to the positive DC voltage value Vdc, the control circuit 33 transmits the switch-control signals Ssw_g1 with a PWM waveform to the gate terminals of the transistors of the middle switch units msd21, msd11, the inner switch unit inf_d1 and the conversion switch unit cvtf_d1 of the conversion module 31a, and transmits the switch-control signals Ssw_g2 with a PWM waveform to the gate terminals of the transistors of the conversion switch unit cvtf_u2, the inner switch unit inf_u2 and the middle switch unit msu12, msu22 of the conversion module 31c. Other non-mentioned switch units are switched off and disabled.

In the first ac-to-dc conversion state a2dST_gp, the AC voltage (AC) rises from the ground voltage Gnd to the positive DC voltage value Vdc. At this time, the current from the AC terminal Np flows to the AC terminal Nn through the inductor La, the transistor of the conversion switch unit cvtf_d1, the transistor of the inner switch unit inf_d1, the diodes of the middle switch units msd11, msd21, the half-DC voltage terminal Ndc_h, the diodes of the middle switch units msu22, msu12, the transistor of the inner switch unit inf_u2 and the transistor of the conversion switch unit cvtf_u2 sequentially.

Please refer to FIGS. 3, 7, 8B, and Table 6 together. The second ac-to-dc conversion state a2dST_pg in FIG. 8B corresponds to the time period Tb in FIG. 7. During the procedure when the AC voltage (AC) is decreasing from the positive DC voltage value Vdc to the ground voltage Gnd, the control circuit 33 transmits the switch-control signals Ssw_g1 with a PWM waveform to the gate terminals of the transistors of the DC switch units dsu11, dsu21, the inner switch unit inf_u1, and the conversion switch unit cvtf_u1 of the conversion module 31a, and transmits the switch-control signals Ssw_g2 with a PWM waveform to the gate terminals of the transistors of the conversion switch unit cvtf_d2, the inner switch unit inf_d2 and the DC switch units dsd22, dsd12 of the conversion module 31c. Other non-mentioned switch units are switched off and disabled.

In the second ac-to-dc conversion state a2dST_pg, the AC voltage (AC) decreases from the positive DC voltage value Vdc to the ground voltage Gnd. At this time, the current from the AC terminal Np flows to the AC terminal Nn through the inductor La, the diode of the conversion switch unit cvtf_u1, the diode of the inner switch unit inf_u1, the diodes of the DC switch units dsu21, dsu11, the battery module 41, the diodes of the DC switch units dsd12, dsd22, the diode of the inner switch unit inf_d2, the diode of the conversion switch unit cvtf_d2 and the inductor Lb sequentially. The current flows through the battery module 41 and thus charges the battery module 41.

Please refer to FIGS. 3, 7, 8C, and Table 6 together. The third ac-to-dc conversion state a2dST_gn in FIG. 8C corresponds to the time period Tc in FIG. 7. During the procedure when the AC voltage (AC) is decreasing from the ground voltage Gnd to the negative DC voltage value −Vdc, the control circuit 33 transmits the switch-control signals Ssw_g1 with a PWM waveform to the gate terminals of the transistors of the middle switch units msu21, msu11, the inner switch unit inf_u1 and the conversion switch unit cvtf_u1 of the conversion module 31a, and transmits the switch-control signals Ssw_g2 with a PWM waveform to the gate terminals of the transistors of the conversion switch unit cvtf_d2, the inner switch unit inf_d2 and the middle switch units msd12, msd22 of the conversion module 31c. Other non-mentioned switch units are switched off and disabled.

In the third ac-to-dc conversion state a2dST_gn, the AC voltage (AC) decreases from the ground voltage Gnd to the negative DC voltage value −Vdc. As shown in FIG. 8C, the current from the AC terminal Np flows to the AC terminal Np through the transistor of the conversion switch unit cvtf_d2, the transistor of the inner switch unit inf_d2, the diodes of the middle switch units msd12, msd22, the half-DC voltage terminal Ndc_h, the diodes of the middle switch units msu21, msu11, the transistor of the inner switch unit inf_u1, the transistor of the conversion switch unit cvtf_u1 and the inductor La sequentially.

Please refer to FIGS. 3, 7, 8D, and Table 6 together. The fourth ac-to-dc conversion state a2dST_ng in FIG. 8D corresponds to the time period Td in FIG. 7. During the procedure when the AC voltage (AC) is rising from the negative DC voltage value −Vdc to the ground voltage Gnd, the control circuit 33 transmits the switch-control signals Ssw_g1 with a PWM waveform to the gate terminals of the transistors of the DC switch units dsd11, dsd21, the inner switch unit inf_d1, and the conversion switch unit cvtf_d1 of the conversion module 31a, and transmits the switch-control signals Ssw_g2 with a PWM waveform to the gate terminals of the transistors of the conversion switch unit cvtf_u2, the inner switch unit inf_u2 and the DC switch units dsu22, dsu12 of the conversion module 31c. Other non-mentioned switch units are switched off and disabled.

In the fourth ac-to-dc conversion state a2dST_ng, the AC voltage (AC) rises from the negative DC voltage value −Vdc to the ground voltage Gnd. As shown in FIG. 8D, the current from the AC terminal Nn flows to the AC terminal Np through the diode of the conversion switch unit cvtf_u2, the diode of the inner switch unit inf_u2, the diodes of the DC switch units dsu22, dsu12, the DC voltage terminal Ndc_p, the battery module 41, the DC voltage terminal Ndc_n, the diodes of the DC switch units dsd11, dsd21, the diode of the inner switch unit inf_d1, the diode of the conversion switch unit cvtf_d1 and the inductor La sequentially. The current flows through the battery module 41 and thus charges the battery module 41.

Please refer to FIGS. 8A and 8C together. The current path in the conversion modules 31a, 31c in FIG. 8A (the first ac-to-dc conversion state a2dST_gp) is a mirror image of the current path in the conversion modules 31c, 31a in FIG. 8C (the third ac-to-dc conversion state a2dST_gn). In other words, the control circuit 33 selects similar switch units in the conversion module 31a during the conversion state corresponding to FIG. 8A and the conversion module 31c during the conversion state corresponding to FIG. 8C. Also, the control circuit 33 selects similar switch units in the conversion module 31c during the conversion state corresponding to FIG. 8A and the conversion module 31a during the conversion state corresponding to FIG. 8C. Similarly, the combination of the switch units receiving the PWM signals in the conversion modules 31a, 31c in FIG. 8B is a mirror image of that in the conversion modules 31c, 31a in FIG. 8D.

Please refer to Table 7, showing, based on the above description with reference to FIGS. 7 and 8A-8D, that the control circuit 33 selects the current paths in the interior elements of the conversion modules 31a, 31c according to the voltage value of the AC voltage (AC) when the voltage conversion device 3 converts the AC voltage (AC) into the DC voltage (DC). It is observed from Table 7 that no current flows to the flying capacitors Cf1, Cf2. In FIGS. 8A-8D. Therefore, the flying capacitors Cf1, Cf2 are not in use (suspended) when the voltage conversion device 3 converts the AC voltage (AC) into the DC voltage (DC).

TABLE 7

| | | Conversion module 31a | | | | Conversion module 31c | | | |
|---|---|---|---|---|---|---|---|---|---|
| | Conversion state of voltage-conversion module | DC stage circuit | | Inner stage circuit | Conversion stage circuit | Conversion stage circuit | Inner stage circuit | DC stage circuit | |
| FIG. | | DC circuit | Middle circuit | | | | | Middle circuit | DC circuit |
| FIG. 8A | a2dST_gp | — | mCKTd1 | inCKTd1 | vCKTd1 | vCKTu2 | inCKTu2 | mCKTu2 | — |
| FIG. 8B | a2dST_pg | dcCKTu1 | — | inCKTu1 | vCKTu1 | vCKTd2 | inCKTd2 | — | dcCKTd2 |
| FIG. 8C | a2dST_gn | — | mCKTu1 | | | | | mCKTd2 | — |
| FIG. 8D | a2dST_ng | dcCKTd1 | — | inCKTd1 | vCKTd1 | vCKTu2 | inCKTu2 | — | dcCKTu2 |

FIGS. 5 and 6A-6H and related descriptions explain how the voltage conversion device 3 converts the DC voltage (DC) into the AC voltage (AC) in eight dc-to-ac conversion states. FIGS. 7 and 8A-8D and related descriptions explain how the voltage conversion device 3 converts the AC voltage (AC) into the DC voltage (DC) in four ac-to-dc conversion states. Comparing the two types of the voltage conversion process, the control circuit 33 selects the same switch units in FIGS. 6D and 8A; the control circuit 33 selects the same switch units in FIGS. 6A and 8B; the control circuit 33 selects the same switch units in FIGS. 6E and 8C; and the control circuit 33 selects the same switch units in FIGS. 6H and 8D.

According to the above description, not only the dc-to-ac conversion but also the ac-to-dc conversion can be performed by switching on proper switch units in the voltage-conversion modules with the control circuit. The voltage conversion device of the disclosure can be switched between different voltage conversion states more rapidly. Based on the disclosed circuit architecture, no additional heat sink or fan is required to dissipate heat in the voltage conversion device. The power consumption of the switch units takes only 0.5% of the overall power consumption. Compared with the full-bridge architecture in the prior arts, the resistors R, the inductors L, the capacitors C, and the filter circuit of the switch units of the disclosure occupy smaller space. Therefore, the voltage conversion device of the disclosure has higher conversion efficiency, smaller size, and reduced hardware cost.

It will be apparent to those skilled in the art that various modifications and variations can be made to the disclosed embodiments. It is intended that the specification and examples be considered exemplary only, with a true scope of the disclosure being indicated by the following claims and their equivalents.

What is claimed is:

1. A voltage conversion device, comprising:
a filter circuit electrically connected to a first alternating current (AC) terminal and a second AC terminal;
a first inductor having a terminal electrically connected to the first AC terminal and another terminal electrically connected to a first conversion terminal;
a second inductor having a terminal electrically connected to the second AC terminal and another terminal electrically connected to a second conversion terminal;
a first conversion module, comprising:
a first direct current (DC) stage circuit, comprising:
a first upper DC circuit, comprising:
a first-first DC switch unit, electrically connected to a first DC voltage terminal; and
a second-first DC switch unit, electrically connected to the first-first DC switch unit;
a first lower DC circuit, comprising:
a third-first DC switch unit, electrically connected to a second DC voltage terminal; and
a fourth-first DC switch unit, electrically connected to the third-first DC switch unit;
a first upper middle circuit, comprising:
a first-first middle switch unit, electrically connected to the second-first DC switch unit; and
a second-first middle switch unit, electrically connected to the first-first middle switch unit and a third DC voltage terminal; and
a first lower middle circuit, comprising:
a third-first middle switch unit, electrically connected to the fourth-first DC switch unit; and
a fourth-first middle switch unit, electrically connected to the third-first middle switch unit and the third DC voltage terminal;
a first conversion stage circuit, comprising:
a first-first conversion switch unit electrically connected to the first conversion terminal; and
a second-first conversion switch unit electrically connected to the first conversion terminal; and
a first inner stage circuit, comprising:
a first-first inner switch unit electrically connected to the second-first DC switch unit, the first-first middle switch unit, and the first-first conversion switch unit; and
a second-first inner switch unit, electrically connected to the fourth-first DC switch unit, the third-first middle switch unit, and the second-first conversion switch unit;
a second conversion module, comprising:
a second DC stage circuit, comprising:
a second upper DC circuit, comprising:
a first-second DC switch unit, electrically connected to the first DC voltage terminal; and
a second-second DC switch unit, electrically connected to the first-second DC switch unit;
a second lower DC circuit, comprising:
a third-second DC switch unit, electrically connected to the second DC voltage terminal; and
a fourth-second DC switch unit, electrically connected to the third-second DC switch unit;
a second upper middle circuit, comprising:
a first-second middle switch, electrically connected to the second-second DC switch unit; and
a second-second middle switch unit, electrically connected to the first-second middle switch unit and the third DC voltage terminal;

a second lower middle circuit, comprising:
    a third-second middle switch unit, electrically connected to the fourth-second DC switch unit; and
    a fourth-second middle switch unit, electrically connected to the third-second middle switch unit and the third DC voltage terminal;
a second conversion stage circuit, comprising:
    a first-second conversion switch unit, electrically connected to the second conversion terminal; and
    a second-second conversion switch unit, electrically connected to the second conversion terminal; and
a second inner stage circuit, comprising:
    a first-second inner switch unit, electrically connected to the second-second DC switch unit, the first-second middle switch unit, and the first-second conversion switch unit; and
    a second-second inner switch unit, electrically connected to the fourth-second DC switch unit, the third-second middle switch unit, and the second-second conversion switch unit; and
a control circuit electrically connected to the first conversion module and the second conversion module, configured for transmitting a plurality of first switch-control signals to the first conversion module and transmitting a plurality of second switch-control signals to the second conversion module, wherein
a first current path in the first DC stage circuit, the first conversion stage circuit, and the first inner stage circuit is selected in response to the first switch-control signals, and a second current path in the second DC stage circuit, the second conversion stage circuit and the second inner stage circuit is selected in response to the second switch-control signals, wherein a voltage difference between the first DC voltage terminal and the second DC voltage terminal is equivalent to two times of a voltage difference between the third DC voltage terminal and the second DC voltage terminal.

2. The voltage conversion device according to claim 1, wherein
    the third-first DC switch unit, the fourth-first DC switch unit, the first-first middle switch unit, the second-first middle switch unit, the third-first middle switch unit, and the fourth-first middle switch unit are switched off when the first-first DC switch unit and the second-first DC switch unit receive the first switch-control signals with a PWM waveform; and
    the first-second DC switch unit, the second-second DC switch unit, the first-second middle switch, the second-second middle switch unit, the third-second middle switch unit, and the fourth-second middle switch unit are switched off when the third-second DC switch unit and the fourth-second DC switch unit receive the second switch-control signals with the PWM waveform.

3. The voltage conversion device according to claim 1, wherein:
    the first conversion module further comprises:
        a first flying capacitor electrically connected to the first upper inner circuit, the first upper conversion circuit, the first lower inner circuit, and the first lower conversion circuit, wherein the first flying capacitor is suspended, charged, or discharged according to the first current path; and
    the second conversion module further comprises:
        a second flying capacitor electrically connected to the second upper inner circuit, the second upper conversion circuit, the second lower inner circuit, and the second lower conversion circuit, wherein the second flying capacitor is suspended, charged, or discharged according to the second current path, wherein:
            a voltage between the first DC voltage terminal and the second DC voltage terminal is equivalent to four times of a cross-voltage of the first flying capacitor, and
            the cross-voltage of the first flying capacitor is equal to a cross-voltage of the second flying capacitor.

4. The voltage conversion device according to claim 1, wherein
    the first conversion module and the second conversion module receive a DC voltage, between the first DC voltage terminal and the second DC voltage terminal, from a battery module;
    the first conversion module and the second conversion module generate a modified sine wave between the first conversion terminal and the second conversion terminal; and
    the filter circuit filters the modified sine wave to generate an AC voltage between the first AC terminal and the second AC terminal, wherein
    the modified sine wave has a voltage equal to a positive DC voltage value when the first conversion module and the second conversion module enter a first conversion state;
    the modified sine wave has a voltage equal to half the positive DC voltage value when the first conversion module and the second conversion module enter a second conversion state or a third conversion state;
    the modified sine wave has a voltage equal to a ground voltage when the first conversion module and the second conversion module enter a fourth conversion state or a fifth conversion state;
    the modified sine wave has a voltage equal to half a negative DC voltage value when the first conversion module and the second conversion module enter a sixth conversion state or a seventh conversion state; and
    the modified sine wave has a voltage equal to the negative DC voltage value when the first conversion module and the second conversion module enter an eighth conversion state, wherein:
    the first-first DC switch unit, the second-first DC switch unit, the first-first inner switch unit, the first-first conversion switch unit, the second-second conversion switch unit, the second-second inner switch, the fourth-second DC switch unit, and the third-second DC switch unit, configured for receiving a first PWM signal in the first conversion state, are switched off in the eighth conversion state;
    the first-first DC switch unit, the second-first DC switch unit, the first-first inner switch unit, the second-first conversion switch unit, the first-second conversion switch unit, the second-second inner switch, the fourth-second DC switch unit, and the third-second DC switch unit, configured for receiving a second PWM signal in the second conversion state, are switched off in the seventh conversion state;
    the fourth-first middle switch unit, the third-first middle switch unit, the second-first inner switch unit, the first-first conversion switch unit, the second-second conversion switch unit, the first-second inner switch unit, the first-second middle switch unit, and the second-second middle switch unit, configured for receiving a third PWM signal in the third conversion state, are switched off in the sixth conversion state;

the fourth-first middle switch unit, the third-first middle switch unit, the second-first inner switch unit, the second-first conversion switch unit, the first-second conversion switch unit, the first-second inner switch unit, the first-second middle switch unit, and the second-second middle switch unit, configured for receiving a fourth PWM signal in the fourth conversion state, are switched off in the fifth conversion state;

the fourth-second middle switch unit, the third-second middle switch unit, the second-second inner switch unit, the second-second conversion switch unit, the first-first conversion switch unit, the first-first inner switch unit, the first-first middle switch unit, and the second-first middle switch unit, configured for receiving a fifth PWM signal in the fifth conversion state, are switched off in the fourth conversion state;

the fourth-second middle switch unit, the third-second middle switch unit, the second-second inner switch unit, the first-second conversion switch unit, the second-first conversion switch unit, the first-first inner switch unit, the first-first middle switch unit, and the second-first middle switch unit, configured for receiving a sixth PWM signal in the sixth conversion state, are switched off in the third conversion state;

the first-second DC switch unit, the second-second DC switch unit, the first-second inner switch unit, the second-second conversion switch unit, the first-first conversion switch unit, the second-first inner switch unit, the fourth-first DC switch unit, and the third-first DC switch unit, configured for receiving a seventh PWM signal in the seventh conversion state, are switched off in the second conversion state; and the first-second DC switch unit, the second-second DC switch unit, the first-second inner switch unit, the first-second conversion switch unit, the second-first conversion switch unit, the second-first inner switch unit, the fourth-first DC switch unit, and the third-first DC switch unit, configured for receiving an eighth PWM signal in the eighth conversion state, are switched off in the first conversion state.

5. The voltage conversion device according to claim 1, wherein
an AC voltage is received between the first AC terminal and the second AC terminal;
the second-first conversion switch unit, the second-first inner switch unit, the third-first middle switch unit, the fourth-first middle switch unit, the second-second middle switch unit, the first-second middle switch unit, the first-second inner switch unit, and the first-second conversion switch unit receive a first PWM signal when the AC voltage rises from a ground voltage to a positive DC voltage value, wherein a first current from the first AC terminal flows to the second AC terminal through the first inductor, the second-first conversion switch unit, the second-first inner switch unit, the third-first middle switch unit, the fourth-first middle switch unit, the third DC voltage terminal, the second-second middle switch unit, the first-second middle switch unit, the first-second inner switch unit, the first-second conversion switch unit, and the second inductor sequentially to generate a DC voltage between the first DC voltage terminal and the second DC voltage terminal;
the first-first conversion switch unit, the first-first inner switch unit, the second-first DC switch unit, the first-first DC switch unit, the third-second DC switch unit, the fourth-second DC switch unit, the second-second inner switch unit, and the second-second conversion switch unit receive a second PWM signal when the AC voltage is decreasing from the positive DC voltage value to the ground voltage, wherein a second current from the first AC terminal flows to the second AC terminal through the first inductor, the first-first conversion switch unit, the first-first inner switch unit, the second-first DC switch unit, the first-first DC switch unit, the first DC voltage terminal, a battery module, the second DC voltage terminal, the third-second DC switch unit, the fourth-second DC switch unit, the second-second inner switch unit, the second-second conversion switch unit, and inductor sequentially to generate the DC voltage;
the second-second conversion switch unit, the second-second inner switch unit, the third-second middle switch unit, the fourth-second middle switch unit, the second-first middle switch unit, the first-first middle switch unit, the first-first inner switch unit, and the first-first conversion switch unit receive a third PWM signal when the AC voltage is decreasing from the ground voltage to a negative DC voltage value, wherein a third current from the second AC terminal flows to the first AC terminal through the second inductor, the second-second conversion switch unit, the second-second inner switch unit, the third-second middle switch unit, the fourth-second middle switch unit, the third DC voltage terminal, the second-first middle switch unit, the first-first middle switch unit, the first-first inner switch unit, the first-first conversion switch unit, and the first inductor sequentially to generate the DC voltage; and
the first-second conversion switch unit, the first-second inner switch unit, the second-second DC switch unit, the first-second DC switch unit, the third-first DC switch unit, the fourth-first DC switch unit, the second-first inner switch unit, and the second-first conversion switch unit receive a fourth PWM signal when the AC voltage rises from the negative DC voltage value to the ground voltage, wherein a fourth current from the second AC terminal flows to the first AC terminal through the second inductor, the first-second conversion switch unit, the first-second inner switch unit, the second-second DC switch unit, the first-second DC switch unit, the first DC voltage terminal, the battery module, the second DC voltage terminal, the third-first DC switch unit, the fourth-first DC switch unit, the second-first inner switch unit, the second-first conversion switch unit, and the first inductor sequentially to generate the DC voltage.

6. The voltage conversion device according to claim 1, wherein the voltage conversion device is electrically connected to a battery module, and the voltage conversion device receives a DC voltage from the battery module and outputs an AC voltage between the first AC terminal and the second AC terminal.

7. The voltage conversion device according to claim 6, wherein a modified sine wave is generated between the first conversion terminal and the second conversion terminal.

8. The voltage conversion device according to claim 7, wherein:
the control circuit transmits the first switch-control signals to the first-first DC switch unit, the second-first DC switch unit, the first-first inner switch unit, and the first-first conversion switch unit, and
the control circuit transmits the second switch-control signals to the second-second conversion switch unit, the second-second inner switch unit, the fourth-second DC switch unit, and the third-second DC switch unit,
wherein a current from the first DC voltage terminal flows to the second DC voltage terminal through the first-first DC switch unit, the second-first DC switch unit, the first-first inner switch unit, and the first-first conversion switch unit, the first inductor, the filter circuit, the second inductor, the second-second conversion switch unit, the second-second inner switch, the fourth-second DC switch unit, and the third-second DC switch unit sequentially to generate the modified sine wave having a voltage equal to a positive DC voltage value.

9. The voltage conversion device according to claim 7, wherein:
the control circuit transmits the first switch-control signals to the first-first DC switch unit, the second-first DC switch unit, the first-first inner switch unit, and the second-first conversion switch unit, and
the control circuit transmits the second switch-control signals to the first-second conversion switch unit, the second-second inner switch, the fourth-second DC switch unit, and the third-second DC switch unit,
wherein a current from the first DC voltage terminal flows to the second DC voltage terminal through the first-first DC switch unit, the second-first DC switch unit, the first-first inner switch unit, the second-first conversion switch unit, the first inductor, the filter circuit, the second inductor, the first-second conversion switch unit, the second-second inner switch, the fourth-second DC switch unit, and the third-second DC switch unit sequentially to generate the modified sine wave having a voltage equal to half a positive DC voltage value.

10. The voltage conversion device according to claim 7, wherein:
the control circuit transmits the first switch-control signals to the fourth-first middle switch unit, the third-first middle switch unit, the second-first inner switch unit, and the first-first conversion switch unit, and
the control circuit transmits the second switch-control signals to the second-second conversion switch unit, the first-second inner switch unit, the first-second middle switch unit, and the second-second middle switch unit,
wherein a current from the third DC voltage terminal flows back to the third DC voltage terminal through the fourth-first middle switch unit, the third-first middle switch unit, the second-first inner switch unit, the first-first conversion switch unit, the first inductor, the filter circuit, the second inductor, the second-second conversion switch unit, the first-second inner switch unit, the first-second middle switch unit, and the second-second middle switch unit sequentially to generate the modified sine wave having a voltage equal to half a positive DC voltage value.

11. The voltage conversion device according to claim 7, wherein:
the control circuit transmits the first switch-control signals to the fourth-first middle switch unit, the third-first middle switch unit, the second-first inner switch unit, and the second-first conversion switch unit, and
the control circuit transmits the second switch-control signals to the first-second conversion switch unit, the first-second inner switch unit, the first-second middle switch unit, and the second-second middle switch unit to generate the modified sine wave having a voltage equal to a ground voltage.

12. The voltage conversion device according to claim 7, wherein:
the control circuit transmits the second switch-control signals to the fourth-second middle switch unit, the third-second middle switch unit, the second-second inner switch unit, and the second-second conversion switch unit, and
the control circuit transmits the first switch-control signals to the first-first conversion switch unit, the first-first inner switch unit, the first-first middle switch unit, and the second-first middle switch unit to generate the modified sine wave having a voltage equal to a ground voltage.

13. The voltage conversion device according to claim 7, wherein:
the control circuit transmits the second switch-control signals to the fourth-second middle switch unit, the third-second middle switch unit, the second-second inner switch unit, and the first-second conversion switch unit, and
the control circuit transmits the first switch-control signals to the second-first conversion switch unit, the first-first inner switch unit, the first-first middle switch unit, and the second-first middle switch unit,
wherein a current from the third DC voltage terminal flows back to the third DC voltage terminal through the fourth-second middle switch unit, the third-second middle switch unit, the second-second inner switch unit, the first-second conversion switch unit, the second inductor, the filter circuit, the first inductor, the second-first conversion switch unit, the first-first inner switch unit, the first-first middle switch unit, and the second-first middle switch unit sequentially to generate the modified sine wave having a voltage equal to half a negative DC voltage value.

14. The voltage conversion device according to claim 7, wherein:
the control circuit transmits the second switch-control signals to the first-second DC switch unit, the second-second DC switch unit, the first-second inner switch unit, and the second-second conversion switch unit, and
the control circuit transmits the first switch-control signals to the first-first conversion switch unit, the second-first inner switch unit, the fourth-first DC switch unit, and the third-first DC switch unit,
wherein a current from the first DC voltage terminal flows to the second DC voltage terminal through-the first-second DC switch unit, the second-second DC switch unit, the first-second inner switch unit, the second-second conversion switch unit, the second inductor, the filter circuit, the first inductor, the first-first conversion switch unit, the second-first inner switch unit, the fourth-first DC switch unit, and the third-first DC switch unit sequentially to generate the modified sine wave having a voltage equal to half a negative DC voltage value.

15. The voltage conversion device according to claim 7, wherein:
the control circuit transmits the second switch-control signals to the first-second DC switch unit, the second-second DC switch unit, the first-second inner switch unit, and the first-second conversion switch unit, and
the control circuit transmits the first switch-control signals to the second-first conversion switch unit, the second-first inner switch unit, the fourth-first DC switch unit, and the third-first DC switch unit, wherein a current from the first DC voltage terminal flows to the second DC voltage terminal through the first-second DC switch unit, the second-second DC switch unit, the first-second inner switch unit, the first-second conversion switch unit, the second inductor, the filter circuit, the first inductor, the second-first conversion switch unit, the second-first inner switch unit, the fourth-first DC switch unit, and the third-first DC switch unit sequentially to generate the modified sine wave having a voltage equal to a negative DC voltage value.

16. The voltage conversion device according to claim 1, wherein the voltage conversion device is electrically connected to a battery module, and the voltage conversion device receives an AC voltage between the first AC terminal and the second AC terminal and outputs a DC voltage to the battery module through the first DC voltage terminal and the second DC voltage terminal.

17. The voltage conversion device according to claim 16, wherein when the AC voltage is rising from a ground voltage to a positive DC voltage value, the control circuit transmits the first switch-control signals to the second-first conversion switch unit, the second-first inner switch unit, the third-first middle switch unit, and the fourth-first middle switch unit, and
   the control circuit transmits the second switch-control signals to the second-second middle switch unit, the first-second middle switch unit, the first-second inner switch unit, and the first-second conversion switch unit,
   wherein a current from the first AC terminal flows to the second AC terminal through the first inductor, the first conversion terminal, the second-first conversion switch unit, the second-first inner switch unit, the third-first middle switch unit, the fourth-first middle switch unit, the third DC voltage terminal, the second-second middle switch unit, the first-second middle switch unit, the first-second inner switch unit, the first-second conversion switch unit, the second conversion terminal, and the second inductor sequentially.

18. The voltage conversion device according to claim 16, wherein when the AC voltage is decreasing from a positive DC voltage value to a ground voltage,
   the control circuit transmits the first switch-control signals to the first-first conversion switch unit, the first-first inner switch unit, the second-first DC switch unit, and the first-first DC switch unit, and
   the control circuit transmits the second switch-control signals to the third-second DC switch unit, the fourth-second DC switch unit, the second-second inner switch unit, and the second-second conversion switch unit,
   wherein a current from the first AC terminal flows to the second AC terminal through the first inductor, the first conversion terminal, the first-first conversion switch unit, the first-first inner switch unit, the second-first DC switch unit, the first-first DC switch unit, the battery module, the third-second DC switch unit, the fourth-second DC switch unit, the second-second inner switch unit, the second-second conversion switch unit, the second conversion terminal, and the second inductor sequentially.

19. The voltage conversion device according to claim 16, wherein when the AC voltage is decreasing from a ground voltage to a negative DC voltage value,
   the control circuit transmits the second switch-control signals to the second-second conversion switch unit, the second-second inner switch unit, the third-second middle switch unit, and the fourth-second middle switch unit, and
   the control circuit transmits the first switch-control signals to the second-first middle switch unit, the first-first middle switch unit, the first-first inner switch unit, and the first-first conversion switch unit,
   wherein a current from the second AC terminal flows to the first AC terminal through the second inductor, the second conversion terminal, the second-second conversion switch unit, the second-second inner switch unit, the third-second middle switch unit, the fourth-second middle switch unit, the third DC voltage terminal, the second-first middle switch unit, the first-first middle switch unit, the first-first inner switch unit, the first-first conversion switch unit, the first conversion terminal, and the first inductor sequentially.

20. The voltage conversion device according to claim 16, wherein when the AC voltage is rising from a negative DC voltage value to a ground voltage,
   the control circuit transmits the second switch-control signals to the first-second conversion switch unit, the first-second inner switch unit, the second-second DC switch unit, and the first-second DC switch unit, and
   the control circuit transmits the first switch-control signals to the third-first DC switch unit, the fourth-first DC switch unit, the second-first inner switch unit, and the second-first conversion switch unit,
   wherein a current from the second AC terminal flows to the first AC terminal through the second inductor, the second conversion terminal, the first-second conversion switch unit, the first-second inner switch unit, the second-second DC switch unit, the first-second DC switch unit, the first DC voltage terminal, the battery module, the second DC voltage terminal, the third-first DC switch unit, the fourth-first DC switch unit, the second-first inner switch unit, the second-first conversion switch unit, the first conversion terminal, and the first inductor sequentially.

* * * * *